United States Patent [19]
Yao et al.

[11] Patent Number: 5,723,856
[45] Date of Patent: Mar. 3, 1998

[54] OPTO-ELECTRONIC OSCILLATOR HAVING A POSITIVE FEEDBACK WITH AN OPEN LOOP GAIN GREATER THAN ONE

[75] Inventors: Xiaotian Steve Yao, Diamond Bar; Lutfollah Maleki, San Marino, both of Calif.

[73] Assignee: California Institute of Technology, Pasadena, Calif.

[21] Appl. No.: 510,064

[22] Filed: Aug. 1, 1995

[51] Int. Cl.$^6$ .................................................... H01S 3/098
[52] U.S. Cl. ....................... 250/227.11; 250/205; 372/18; 359/184
[58] Field of Search ...................... 250/205, 214.1, 250/214 R, 227.11, 227.12, 227.17, 227.18, 227.21; 359/315, 316, 317, 318, 319, 320, 181, 187, 184; 372/12, 18

[56] References Cited

U.S. PATENT DOCUMENTS

| | | | |
|---|---|---|---|
| 3,569,715 | 3/1971 | Horning | 359/161 |
| 4,700,150 | 10/1987 | Hall et al. | 359/279 |
| 5,343,324 | 8/1994 | Le et al. | 359/184 |
| 5,379,309 | 1/1995 | Logan, Jr. | 372/18 |
| 5,400,417 | 3/1995 | Allie et al. | 385/2 |
| 5,495,359 | 2/1996 | Gertel et al. | 359/245 |
| 5,532,857 | 7/1996 | Gertel et al. | 359/154 |

OTHER PUBLICATIONS

A. Neyer and E. Voges, Hybrid Electro-Optical Multivibrator Operating By Finite Feedback Delay, Jan. 21, 1982, Electronics Letters.

H.M. Gibs, F.A. Hopf, D.L. Kaplan, M.W. Derstine, R.L. Shoemaker, Periodic Oscillations and Chaos in Optical Bistability: Possible Guided-Wave All-Optical Square-Wave Oscillators, 1981, SPIE col. 317.

A. Neyer and E. Voges, High-Frequency Electro-Optic Using an Integrated Interferometer, Jan. 1, 1982, Appl. Phys. Lett. 40(1).

(List continued on next page.)

*Primary Examiner*—Edward P. Westin
*Assistant Examiner*—John R. Lee
*Attorney, Agent, or Firm*—Fish & Richardson P.C.

[57] ABSTRACT

An electro-optical oscillator includes an electro-optical modulator having an electrical input port that accepts an electrical control signal and an optical output port. The electro-optical modulator is operable to generate at the optical output port an optical signal that oscillates at a frequency related to the electrical control signal. The oscillator also includes a photodetector that converts a portion of the optical signal from the optical output port of the electro-optical modulator to an electrical signal and provides the electrical signal to the electrical input port of the electro-optical modulator as the electrical control signal. An open loop gain of a feedback loop including the optical output port, the photodetector and the electrical input port is greater than one.

41 Claims, 14 Drawing Sheets

OTHER PUBLICATIONS

A. Neyer and E. Voges, NonLinear Electrooptic Oscillator Using an Integrated Interferometer, May 1, 1981 Optics Communications vol. 37, No. 3.

A. Neyer and E. Voges, Dynamics of Electrooptic Bistable Devices with Delayed Feedback, Dec. 1982, IEEE Journal of Quantum Electronics, vol. QE–18, No. 12.

H.F. Schlaak and R.Th. Kersten, Integrated Optical Oscillators and Their Applications to Optical Communication Systems, Optics Communications vol. 36, No. 3, Feb. 1981.

Tahito Aida and Peter Davis, Oscillation Modes of Laser Diode Pumped Hybrid Bistable with Large Delay and Application to Dynamical Memory, Mar. 1992, IEEE Journal of Quantum Electronics, vol. 28, No. 3.

X. Steve Yao and Lute Maleki, Optoelectronic Microwave Oscillator, Aug. 1996, J. Opt. Soc. Am. B/Vol. 13, No. 8.

X. Steve Yao and George Lutes, A High–Speed Photonic Clock and Carrier Recovery Device, May 1996, IEEE Photonics Technology Letters, vol. 8, No. 5.

X. Steve Yao and Lute Maleki, Converting Light Into Spectrally Pure Microwave Oscillation, Apr. 1, 1996, Optics Letters vol. 21, No. 7.

X. Steve Yao and Lute Maleki, Optoelectronic Oscillator for Photonic Systems, Apr. 7, 1996, IEEE Journal of Quantum Electronics, vol. 32, No. 7.

X.S. Yao and L. Maleki, High Frequency Optical Subcarrier Generator, Apr. 21, 1994, Electronics Letters Online No.: 19941033.

X.S. Yao et al., "High Frequency Optical Subcarrier Generator," Electronics Letters, vol. 30, No. 18, Sep. 1, 1994, pp. 1525–1526.

OPTO-ELECTRONIC OSCILLATOR HAVING A POSITIVE FEEDBACK WITH AN OPEN LOOP GAIN GREATER THAN ONE

ORIGIN OF INVENTION

The invention described herein was made in the performance of work under a NASA contract, and is subject to the provisions of Public Law 96-517 (35 USC 202) in which the Contractor has elected to retain title.

BACKGROUND AND SUMMARY OF THE INVENTION

Radio frequency ("RF") oscillators, especially voltage controlled oscillators ("VCOs"), are essential to RF communication, broadcasting and receiving systems. RF oscillators often generate, track, clean, amplify and distribute RF carriers. In a phase locked loop configuration, VCOs can also be used for clock recovery, carrier recovery, signal modulation and demodulation, and frequency synthesis.

A photonic RF system embeds photonic (i.e., optical) technology into a traditional RF system. In particular, a photonic RF system uses optical waves as carriers to transport RF signals through optical media (e.g., optical fiber) to remote locations. RF signal processing functions, such as signal mixing, antenna beam steering and signal filtering, can be accomplished optically. Optical technology offers the advantages of low loss, light weight, high frequency, high security, remoting capability, and immunity to electromagnetic interference, and therefore is desirable in many RF systems.

The inventors realized that traditional RF oscillators cannot meet all of the requirements of photonic RF systems. One reason is because photonic RF systems involve RF signals in both the optical domain and the electrical domain. The inventors realized that an ideal oscillator for a photonic RF system should be able to generate both optical and electrical RF signals. In addition, such a system should allow synchronizing or controlling the oscillator using both electrical and optical references or signals.

Presently, an optical high frequency RF signal is usually generated by modulating a diode laser or an electro-optical ("E/O") modulator using a high frequency stable electrical signal from a local oscillator ("LO"). Such a local oscillator signal is generally obtained by multiplying a low frequency reference, (e.g., a signal produced by a quartz oscillator or a Hydrogen maser) to a required high frequency (e.g., 32 GHz) with several stages of multipliers and amplifiers. Consequently, the resulting system is bulky, complicated, inefficient, and costly.

An alternative way of generating photonic RF carriers is by mixing two lasers with different optical frequencies. However, the bandwidth of the resulting signal, which is limited by the spectral width of the lasers, is wide (typically greater than tens of kilohertz). In addition, drift of the optical frequencies of the two lasers causes the frequency stability of the beat signal to become poor. While the frequency stability of the beat signal can be stabilized by phase locking the signal to an external stable reference having the same frequency, this would defeat the purpose of using lasers to generate a high frequency (i.e., a high frequency LO signal would still be required).

The invention features a novel opto-electronic oscillator ("O/E") for photonic RF systems. The oscillator, which may also be referred to as a photonic oscillator, is capable of generating stable signals at frequencies up to 70 GHz in both the electrical domain and the optical domain. The oscillator also functions as a voltage controlled oscillator with optical and electrical outputs. It can be used to make a phase locked loop (PLL) and to perform all functions performed for RF systems by a traditional PLL for photonic systems. It has optical and electrical inputs, and can be synchronized to a remote reference source by optical or electrical injection locking. It can also be self phase-locked and self injection-locked to generate a high stability photonic RF reference. Applications of the opto-electronic oscillator include high frequency reference regeneration and distribution, high gain frequency multiplication, comb frequency and square wave generation, and clock recovery. The oscillator is inherently unidirectional, immune to back reflections in the loop, and therefore generically stable.

Essentially, an opto-electronic oscillator includes an opto-electronic modulator that is controlled by a feedback loop between an optical output and an electrical control port of the modulator. The feedback loop preferably includes an optical fiber that delivers the optical output to a photodetector. The photodetector converts the optical signal to the electrical signal supplied to the control port. The loop also includes an amplifier and a filter, and an RF coupler that permits the insertion of an external electrical control signal and the extraction of an electrical output signal. An optical coupler positioned before the photodetector permits the insertion of an external optical control signal. The oscillation frequency of the opto-electronic oscillator is controlled by the external control signals and by signals applied to a bias port of the E/O modulator and to a fiber stretcher. The fiber stretcher is connected to the fiber in the feedback loop.

When the opto-electronic oscillator is used for clock recovery or carrier regeneration, it provides a number of advantages over traditional techniques. First, it operates at speeds of up to 70 GHz, and is limited only by the speeds of the photodetector and the E/O modulator of the oscillator. In addition, the amplitude of the recovered signal (clock or carrier) is constant, and is independent of the input power of the signal to be recovered. This is particularly important in clock recovery for time division multiplexed systems, because the clock component contained in the received data stream may vary with time and sender. Also, the recovered signal may be accessed both optically and electrically, which provides easy interfacing with complex systems.

The inventors recognized that since clock recovery and carrier regeneration with an opto-electronic oscillator is based on injection locking, its acquisition time is much shorter than that of a recovery device based on a phase locked loop. Fast acquisition is important for high speed communications such as burst mode communications. In addition, the tracking range is on the order of a few percent of the clock frequency, compared to less than 100 Hz for a device based on a phase locked loop. This, of course, means that the device does not have to be precisely tuned to match the incoming data rate.

The opto-electronic oscillator can be tuned over a broad spectral range, such as many tens of GHz, by changing the filter in the feedback loop, and may be fine tuned by changing the loop delay (by stretching the fiber) or the bias point of the electro-optical modulator. This makes the device flexible in accommodating different systems, designs and signal conditions.

BRIEF DESCRIPTION OF THE DRAWING

FIG. 3B presents experimental data.

DESCRIPTION OF THE PREFERRED EMBODIMENTS

Figure 1A:
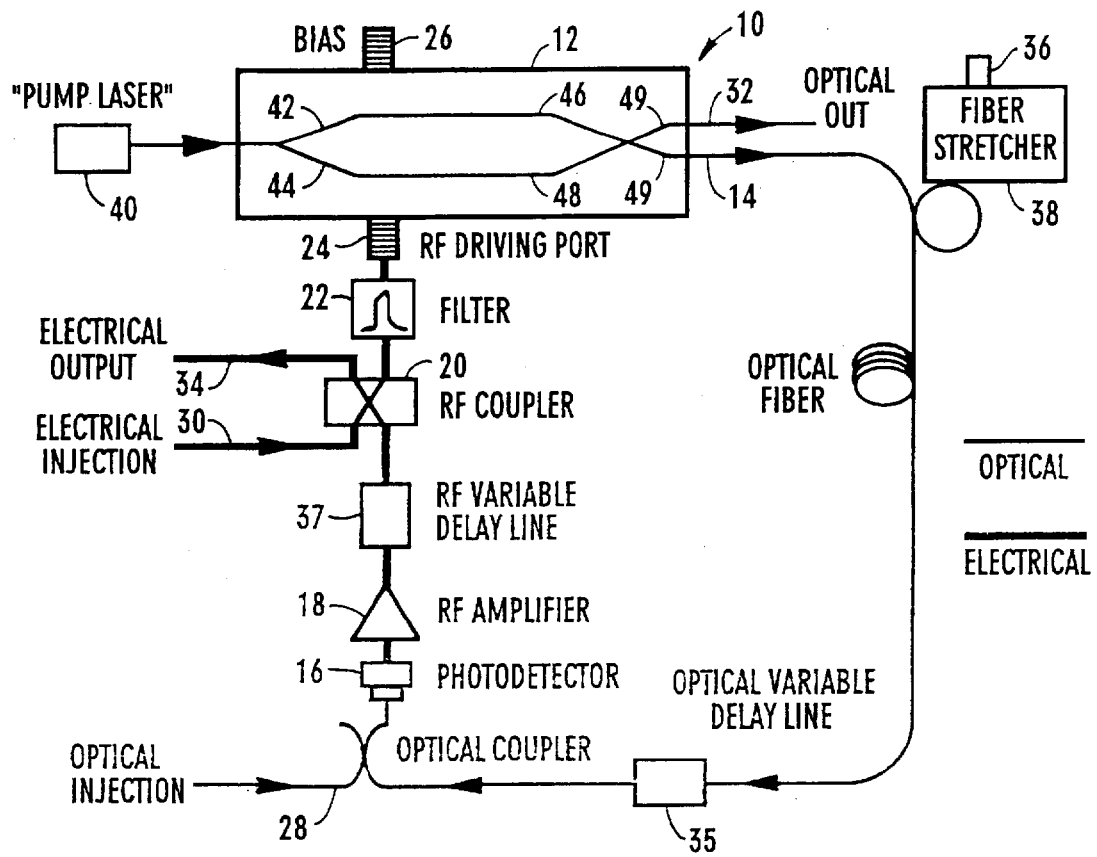
FIG. 1A is a block diagram of an opto-electronic oscillator.

As illustrated in FIG. 1A, an opto-electronic ("O/E") oscillator 10 includes an E/O modulator 12. Light from an output port 14 of the E/O modulator 12 is detected by a photodetector 16 that converts the light to an electrical signal. The electrical signal is supplied to an RF amplifier 18 that amplifies the signal. After passing through an RF coupler 20 and a bandpass filter 22, the amplified signal is supplied to an electrical input port 24 of the E/O modulator 12. The RF amplifier 18 increases the open loop gain of the system, and the bandpass filter 22 removes unwanted oscillation modes and harmonic signals of the modulation. The amplifier and filter, which are not critical to the generation of RF oscillations of the system operation, are each optional components for generating the RF oscillations.

Proper biasing of the E/O modulator 12 is critical for proper operation of the opto-electronic oscillator 10. The biasing point of modulator 12 determines whether the oscillator is bistable, oscillatory or chaotic when the bandpass filter 22 of FIG. 1A is removed from the active feedback loop. Biasing is carried out through bias port 26.

If the E/O modulator 12 is properly biased through bias port 26, and the open loop gain of the feedback loop between output port 14 and RF driving port 24 is properly chosen, self oscillation is sustained. Both optical and electrical processes are involved in the oscillation as described herein; hence, an optical subcarrier and an electrical signal are generated simultaneously. The optical subcarrier is generated at an optical output 32 of the E/O modulator. The electrical signal is generated at an electrical output 34 of the RF coupler 20.

The opto-electronic oscillator 10 includes an optical variable delay line 35 and/or an RF variable delay line 37. Delay lines 35, 37 permit large changes to the loop delay of opto-electronic oscillator 10 and thereby permit the oscillation frequency of opto-electronic oscillator 10 to be adjusted over a large range of frequencies, such as a one hundred megahertz or a few gigahertz. The variable delay lines may be manually or electrically adjusted.

The oscillation frequency of opto-electronic oscillator 10 is fine-tuned through a bias port 26 and a loop length adjustment port 36. Bias port 26 biases the E/O modulator 12. Loop length adjustment port 36 is connected to a fiber stretcher 38 for controlling the loop length and thereby controlling the loop delay.

Figure 1B:
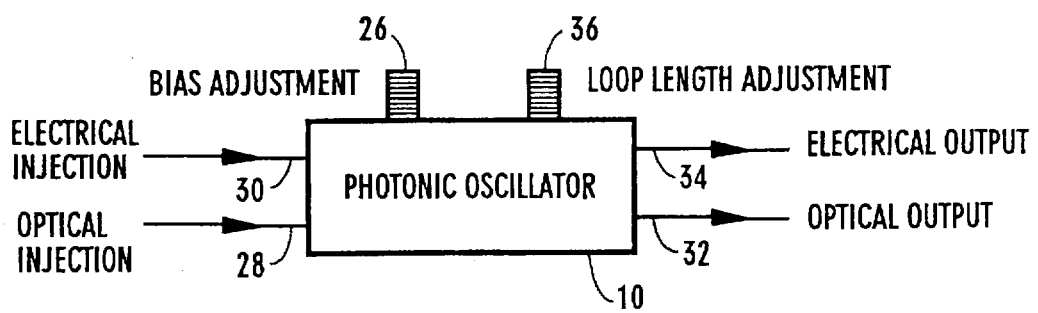
FIG. 1B is a symbolic representation of the opto-electronic oscillator of FIG. 1A.

The above-described opto-electronic oscillator can be summarized by the simple functional block diagram shown in FIG. 1B. The oscillator 10 is a six-port device, with an optical injection port 28, an electrical injection port 30, an optical output port 32, an electrical output port 34, and two voltage controlling ports. Bias port 26 biases the E/O modulator 12. Loop length adjustment port 36 is connected to a fiber stretcher 38 for controlling the loop length and thereby controlling the loop delay. Because delay lines 35 and 37 typically are not adjusted during operation, they are not illustrated as ports in the functional block diagram of FIG. 1B. However, they may be adjusted during operation in some applications.

As will be explained below, the two injection ports 28, 30 operate to injection lock the opto-electronic oscillator 10 to a reference source either optically or electrically. The two output ports 32, 34 provide an RF carrier in both an optical form (port 32) and an electrical form (port 34). Finally, the two controlling ports 26, 36 operate to tune the oscillation frequency and voltage-control the frequency of opto-electronic oscillator 10. The six ports collectively simplify interfacing of the oscillator to a photonic RF system.

E/O modulator 12 is preferably of the well known Mach-Zehnder type. Alternately, it can be a directional coupler modulator, an electro-absorption modulator, or a quantum well modulator. Modulator 12 generates optical outputs at ports 14 and 32 based on an optical input from an optical source, preferably a pump laser 40. The light from the pump laser 40 is separated into two beams 42, 44 that are directed to wave guides 46, 48 on opposite sides of the modulator 12. The beams 42, 44 are guided in the wave guides 46, 48. The beams then recombine to produce the optical outputs 49 of the modulator.

If the two beams travel paths of different lengths, the beams will be out of phase with each other when they are recombined. The resulting signal will hence have a beat frequency that varies with the phase difference between the beams. The voltages applied to ports 24 and 26 change the lengths of the paths along which the beams 42, 44 travel. Because the phase difference between the beams varies with the difference in the path lengths, the frequency of the output signal of the E/O modulator 12 is controlled by controlling the voltages applied to ports 24 and 26. The voltage applied to the bias port 26 establishes the initial phase difference between the beams and thereby establishes a proper bias.

One important feature of this modulator is the interconnection between the optical and electrical systems in the feedback loop. The optical and electrical signals are both used in feedback: hence both are inherently locked together. If either signal changes, that change is accommodated by the feedback loop.

Figure 2A:
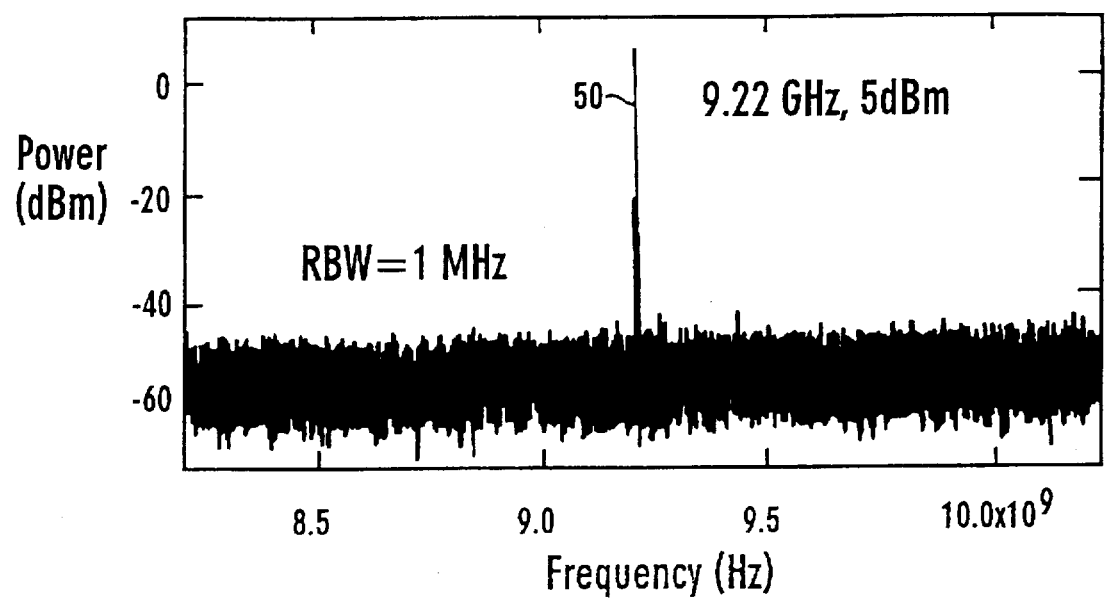
FIGS. 2A and 2B are graphs of spectra of a free running opto-electronic oscillator oscillating at 9.22 GHz (FIG. 2A) and 100 MHz (FIG. 2B).
Figure 2B:
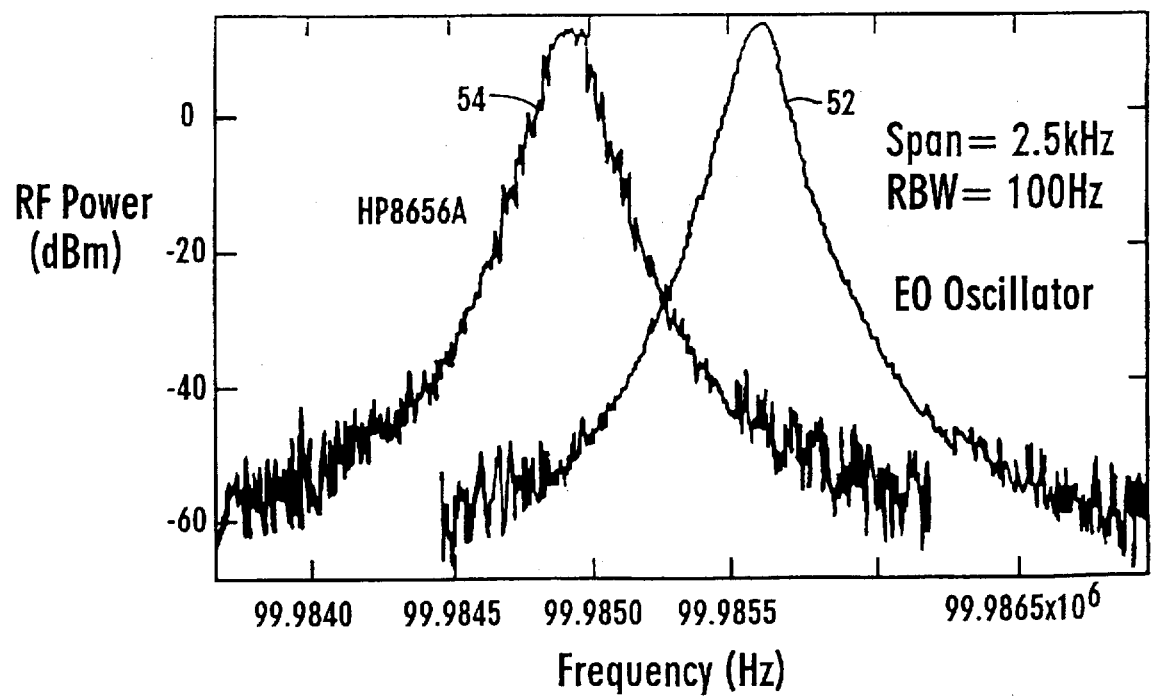

The opto-electronic oscillator used for obtaining the measurements shown in FIGS. 2A and 2B was constructed with different E/O modulators for the modulator 12 and a diode-pumped YAG laser at a wavelength of 1320 nm to generate optical subcarriers as high as 9.2 GHz. FIG. 2A shows the RF signal 50 generated at 9.2 GHz and FIG. 2B shows the signal 52 generated at 100 MHz. In both cases, the opto-electronic oscillators are free running and no effort was made to reduce the noise of the oscillators. For comparison, a signal 54 from a HP8656A signal generator is also shown in FIG. 2B. The spectral purity of signal 52 is dramatically better than that of signal 54.

In the embodiment producing the results of FIG. 2A, the Mach-Zehnder modulator has a bandwidth of 8 GHz and a halfwave voltage $V_\pi$ of approximately 17 V. The photodetector has a bandwidth of 12 GHz and a responsivity of approximately 0.35 A/W. The amplifier has an electrical power gain of 50 dB, a bandwidth of 5 GHz centered around 8 GHz, and output dB compression of 20 dBm. The input and output impedances of all electrical components are 50 $\Omega$. The loop length is approximately 9 meters. In other embodiments, the modulator could be, for example, a directional coupler modulator or an electro-absorption modulator.

As is well known, ambient noise will cause an oscillator to begin oscillating if the gain of a feedback loop of the oscillator is sufficient to amplify the feedback signal of the oscillator relative to the output signal thereof (i.e., when the gain is greater than one). Thus, to start oscillation from noise, the open loop gain of the opto-electronic oscillator 10 must be larger than one. The open loop gain of the opto-electronic oscillator is simply the RF power gain of an externally-modulated photonic link and is given by:

$$G^2_{open} = G^2_{amp} \pi^2 \frac{I^2_{ph} R_L}{V_\pi^2 / R_m}, \quad (1)$$

where $G_{open}$ is the open loop voltage gain, $I_{ph}$ is the photocurrent in the receiver, $R_L$ is the load resistance of the receiver, $R_m$ is the input impedance of the modulator, $V_\pi$ is the half-wave voltage of the modulator, and $G_{amp}$ is the voltage gain of the amplifier following the photoreceiver.

The modulator 12 in Equation 1 is assumed to be a Mach-Zehnder modulator that is biased at quadrature. The oscillation condition of the opto-electronic oscillator is thus $G_{open} \geq 1$. For $R_L = R_m = R$, this condition becomes:

$$I_{ph} R G_{amp} \geq V_\pi / \pi, \quad (2)$$

It is important to note that the amplifier in the loop is not a necessary condition for oscillation. If $I_{ph} R \geq V_\pi / \pi$, no amplifier is needed ($G_{amp} = 1$). The optical power from the pump laser actually supplies the necessary energy for the opto-electronic oscillator. This is significant because it means that, when the amplifier is eliminated, the opto-electronic oscillator may be powered remotely using an optical fiber. In addition, elimination of the amplifier in the loop would also eliminate any noise associated with the amplifier, and would result in a more stable oscillator. For a modulator with a $V_\pi$ of 3.14 volts and an impedance R of 50$\Omega$, a photocurrent of 20 mA is required to sustain the photonic oscillation without an amplifier. This corresponds to an optical power of 25 mW, taking the responsivity $\rho$ of the photodetector to be 0.8 A/W.

The optical power from the output port that forms the loop is related to an applied voltage by:

$$P(t) = (\alpha P_0 / 2) \{1 - \eta \sin \pi [V(t) / V_\pi + V_B / V_\pi] \}, \quad (3)$$

where $\alpha$ is the fractional insertion loss of the modulator, $V_B$ is the bias voltage, and $\eta$ relates to the extinction ratio of the modulator by $(1+\eta)(1-\eta)$. If P(t) has a positive slope as a function of driving voltage V(t), the modulator is said to be positively biased, otherwise it is negatively biased. Consequently, when $V_B = 0$, the modulator is biased at negative quadrature, while when $V_B = V_\pi$, the modulator is biased at positive quadrature. Note that in most externally modulated photonic links, the E/O modulator can be biased at either positive or negative quadrature without affecting its performance. However, as will be seen next, the biasing polarity will have an important effect on the operation of the opto-electronic oscillator 10.

The applied voltage V(t) of the opto-electronic oscillator is the photovoltage after the filter in the loop: $V(t) = \rho R G_{amp} P(t)$, where $\rho$ is the responsivity of the detector, R is the loop impedance, and $G_{amp}$ is the amplifier voltage gain. The recurrence relation of the oscillating signal in the loop can be easily obtained from Equation 3 to be:

$$u(t) = u_0 \{1 - \eta \sin \pi [u(t-\tau) + u_B] \}, \quad (4)$$

where $\tau$ is the loop delay time, and $u_0$, $u_B$, and u(t) are the normalized photovoltage, normalized bias voltage, and normalized oscillation voltage respectively. They are defined as:

$$u_0 = I_{ph} R G_{amp} / V_\pi \quad (5)$$

$$u_B = V_B / V_\pi \quad (6)$$

$$u(t) = V(t) / V_\pi \quad (7)$$

In Equation 5, $I_{ph} = \alpha \rho P_0 / 2$. Equation 4 simply relates the oscillation voltage at t with that of an earlier time, t−τ.

The oscillating voltage at steady state should repeat itself after a round trip in the loop, that is, u(t)=u(t−τ). This is the self-consistent condition. When a filter in the loop permits only one frequency ($\omega_0$) to oscillate, the solution to Equation 4 has the form:

$$u(t) = a \sin (\omega_0 t + \phi_0), \quad (8)$$

where a is the normalized oscillation amplitude and $\phi_0$ is the phase. Note that in expressing Equation 8 this way, the observation point of the field is chosen to be right after the filter. Substituting Equation 8 in Equation 4 and using the self-consistent condition produces:

$$a \sin(\omega_o t + \phi_o) = u_o \{1 - \eta \sin \pi \{a \sin [\omega_o(t-\tau) + \phi_o] + u_B\}\} \quad (9)$$

Expanding the right hand side of Equation 9 using the Bessel function and picking out the term with the fundamental frequency component results in:

$$a \sin(\omega_o t + \phi_o) = -2u_o \eta J_1(\pi a) \cos(\pi u_B) \sin(\omega_o t + \phi_o - \omega_o \tau) \quad (10)$$

Since the oscillation amplitude $V_{OSC}$ of the oscillator is usually much less than $V_\pi$, the following discussion is restricted to the case in which $J_1(\pi a) \geq 0$ or $\alpha = V_{OSC}/V_\pi \geq 1.21$. With this restriction, Equation 10 results in the following relations for determining the oscillation amplitude and frequency:

$$J_1(\pi a) = \frac{\pi a}{2G_{open}} \quad (11)$$

$$f_o = (k+1/2)/\tau \text{ for } \cos \pi u_B > 0 \quad (12a)$$

$$f_o = k/\tau \text{ for } \cos \pi u_B > 0 \quad (12b)$$

where $f_o = \omega_o/2\pi$ and k is an integer. It is interesting to note from Equation 12 that the oscillation frequency depends on the biasing polarity of the modulator. For negative biasing ($\cos \pi u_B > 0$), the fundamental frequency is $1/(2\tau)$, while for positive biasing ($\cos \pi u_B < 0$), the fundamental frequency is doubled to $1/\tau$.

$G_{open}$ in Equation 11 is the open loop voltage gain of the oscillator and is defined as $$G_{open} = \frac{\pi I_{ph} R G \eta |\cos \pi u_B|}{V_\pi} \quad (13)$$

Figure 3A:
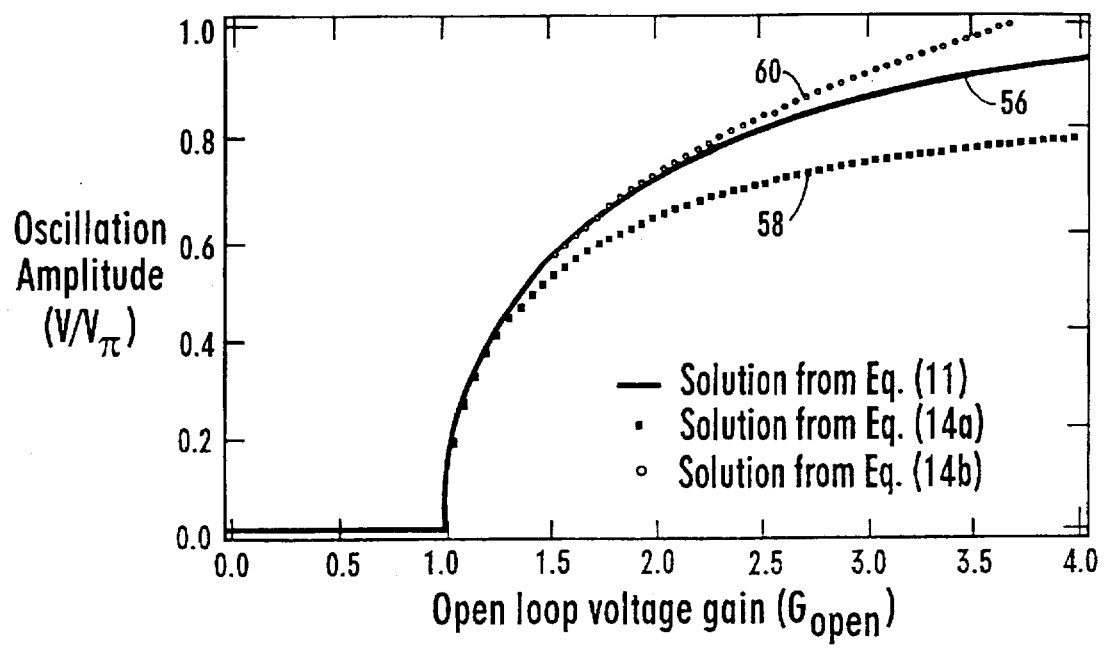
FIGS. 3A and 3B are graphs of oscillation amplitude as a function of open loop gain, where FIG. 3A provides theoretical curves

For the ideal case in which $\eta=1$ and $|\cos \pi u_B|=1$, $G_{open}$ equals the value expected from Equation 1. The amplitude of the oscillation can be obtained by graphically solving Equation 11. The result is shown in FIG. 3A.

Equation 9 can also be solved by expanding its right side into a Taylor series. The resulting normalized oscillation amplitude is:

$$a = \frac{V_{osc}}{V_\pi} = \frac{2\sqrt{2}}{\pi} \sqrt{1 - \frac{1}{G_{open}}} \quad (14a)$$

3rd order expansion $$a = \frac{V_{osc}}{V_\pi} = \frac{2\sqrt{3}}{\pi} \left[ 1 - \frac{1}{\sqrt{3}} \sqrt{\frac{4}{G_{open}} - 1} \right]^{1/2} \quad (14b)$$

5th order expansion

It is clear from Equation 14 that the threshold condition for oscillation is $G_{open} \geq 1$ or $I_{ph} R G \eta |\cos u_B| \geq V_\pi/\pi$. The oscillation frequency obtained using this procedure is the same as is produced by Equation 12.

Figure 3B:
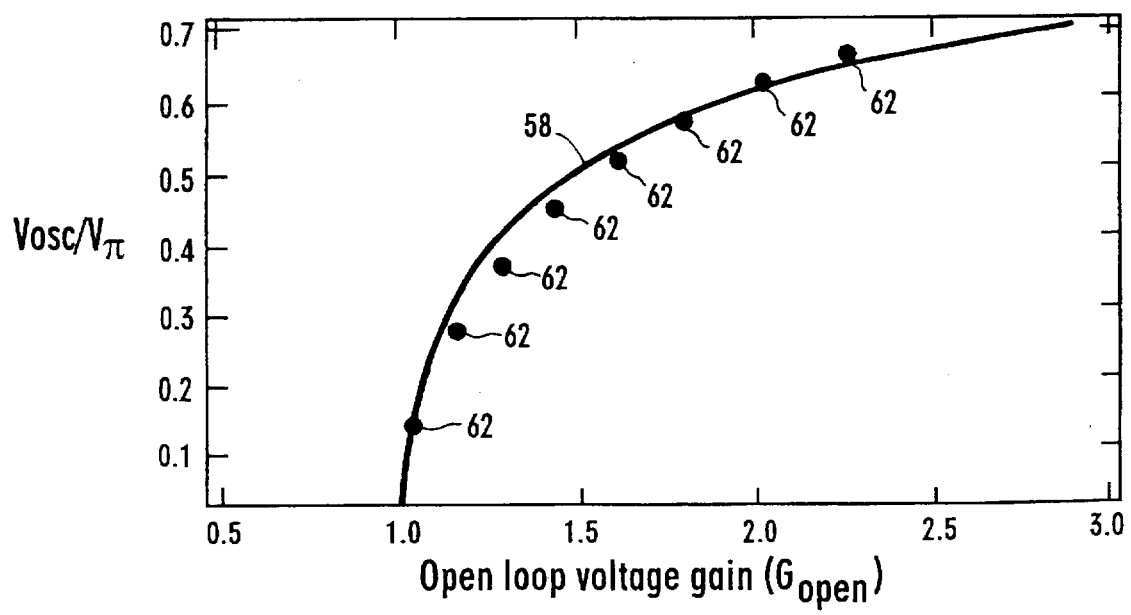

FIG. 3A shows the graphically-obtained normalized oscillation amplitude from Equation 11 (56), Equation 14a (58) and Equation 14b (60), respectively. Comparing the three theoretical curves one can see that for $G_{open} \leq 1.57$, the 3rd order expansion result is a good approximation. For $G_{open} \leq 3.14$, the fifth order expansion result is a good approximation. FIG. 3B shows the experimental data 62 and is in good agreement with the theoretical results of Equation 14a (58).

As described above, the oscillation frequency of the opto-electronic oscillator 10 can be tuned by changing the loop length using a piezo-electric stretcher 38. The frequency change, $\Delta f$, is given by $\Delta f = -f_o \Delta L/L$, where L is the loop length, $\Delta L$ is the loop length change, and $f_o$ is the nominal oscillation frequency. However, the tuning sensitivity (Hz/volt) is expected to be small.

Figure 4A:
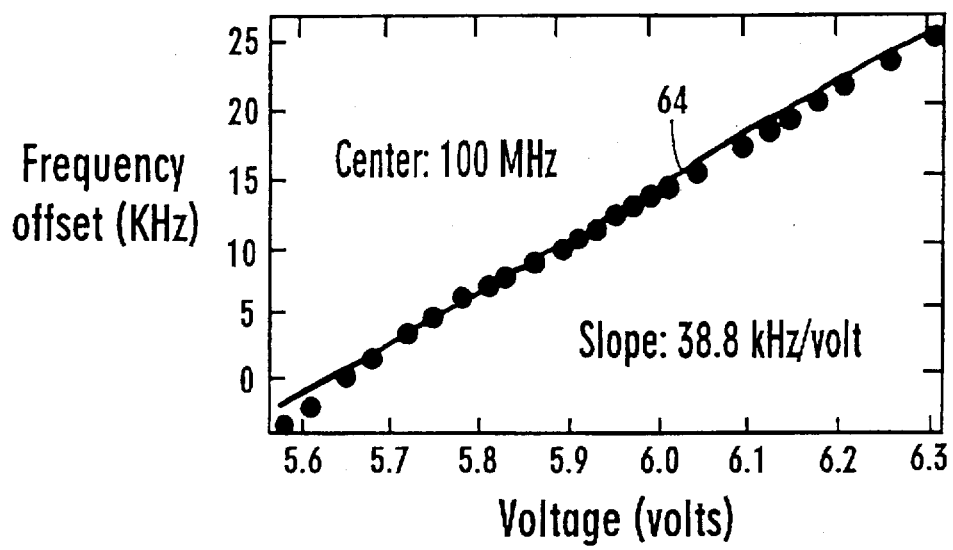
FIG. 4A is a graph of an opto-electronic oscillator's frequency relative to the bias voltage of an opto-electronic modulator of the oscillator.
Figure 4B:
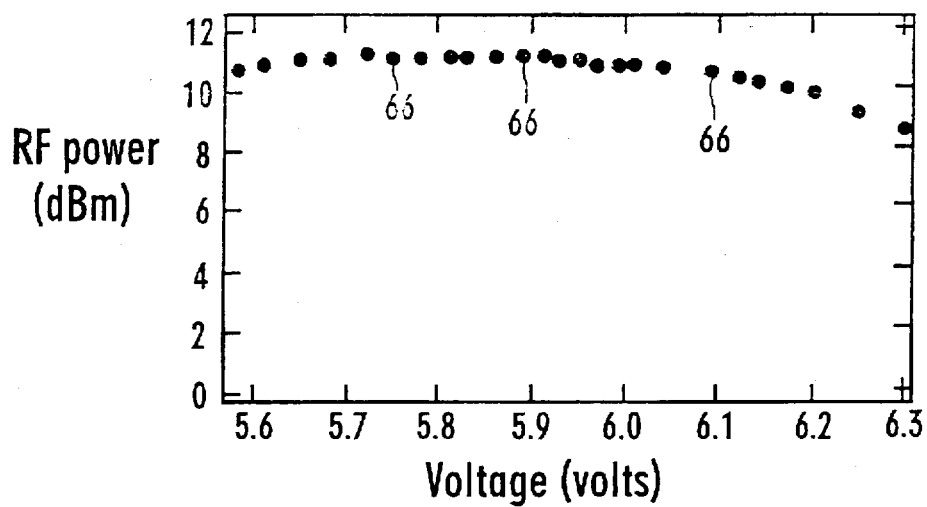
FIG. 4B is a graph of an opto-electronic oscillator's oscillation power relative to bias voltage.

The oscillation frequency can also be tuned by changing the bias voltage of the E/O modulator 12. FIG. 4A shows that the frequency detuning 64 of the oscillator 10 is linearly proportional to the bias voltage, with a slope of 38.8 kHz/volt. The output power 66 of the oscillator 10 remains relatively unchanged in a wide voltage range, as shown in FIG. 4B. This result is significant because it provides a simple way to tune the oscillation frequency with high sensitivity and is instrumental for implementing a phase locked loop (PLL) using the opto-electronic oscillator 10.

The noise properties of the O/E oscillator 10 have also been analyzed. The RF spectral density of the O/E oscillator 10 obtained from the analysis is:

$$S_{RF}(f) = \frac{\delta}{(\delta/2\tau)^2 + (2\pi)^2 (\tau f)^2}, \quad (15)$$

where $\tau$ is the total group delay of the loop, $f$ is the frequency offset from the oscillation frequency, and $\delta$ is the input noise to signal ration of the oscillator, which is defined as:

$$\delta = \rho_N G_{amp}^2 / P_{OSC} \quad (16)$$

In Equation 16, $\rho_N$ is the equivalent input noise density injected into the oscillator from the input port of the amplifier, which includes the contributions of thermal noise, shot noise, and the laser's relative intensity noise. In addition, $P_{OSC}$ is the total oscillating power measured after the amplifier and it relates to the oscillation amplitude $V_{OSC}$ in Equation 11 and Equation 14 by $P_{OSC} = V^2_{OSC}/(2R)$.

As can be seen from Equation 15, the spectral density of the oscillating mode is a Lorentzian function of frequency. The full width at half maximum (FWHM) $\Delta f_{FWHM}$ of the function is:

$$\Delta f_{FWHM} = \frac{1\delta}{2\pi\tau^2} \quad (17)$$

From Equation 17 one can see that $\Delta f_{FWHM}$ is inversely proportional to the square of loop delay time and linearly proportional to the input noise to signal ratio $\delta$. For a typical $\delta$ of $10^{-16}$/Hz and loop delay of 100 ns (20 m), the resulting spectral width is sub-millihertz. The fractional power contained in $\Delta f_{FWHM}$ is $\Delta f_{FWHM} S_{RF}(0) = 64\%$.

From Equation 15 it can be seen that:

$$S_{RF}(f) = \frac{4\tau^2}{\delta} \quad |f| \ll \Delta f_{FWHM}/2 \quad (18a)$$

$$S_{RF}(f) = \frac{\delta}{(2\pi)^2 (\tau f)^2} \quad |f| \gg \Delta f_{FWHM}/2 \quad (18b)$$

The single side band phase noise of a oscillation at a frequency offset $f$ from the center frequency is equal to the spectral density at $f$ if $f$ is much larger than the line width of the oscillation. Therefore, it is evident from Equation 18b that the phase noise of the photonic oscillator decreases quadratically with the frequency offset $f$. For a fixed $f$, the phase noise decreases quadratically with the loop delay time. The larger the $\tau$, the smaller the phase noise.

Equation 15 also indicates that the oscillator's phase noise is independent of the oscillation frequency. This result is significant because it allows the generation of high frequency and low phase noise signals using the O/E oscillator 10. The phase noise of a signal generated using other methods generally increases linearly with the frequency.

Figure 4C:
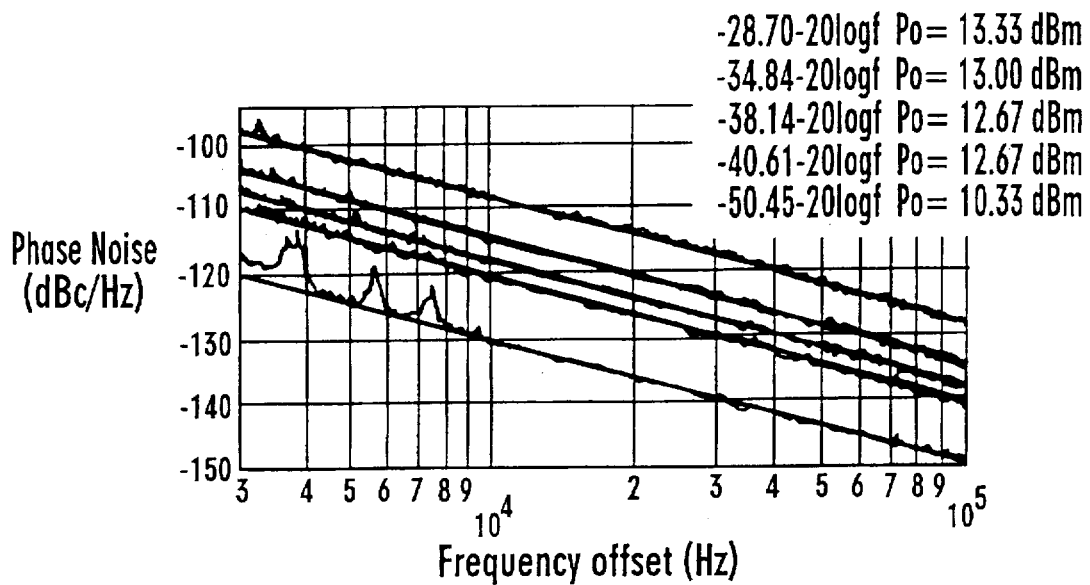
FIG. 4C is a graph of an opto-electronic oscillator's measured phase noise as a function of frequency offset.
Figure 4D:
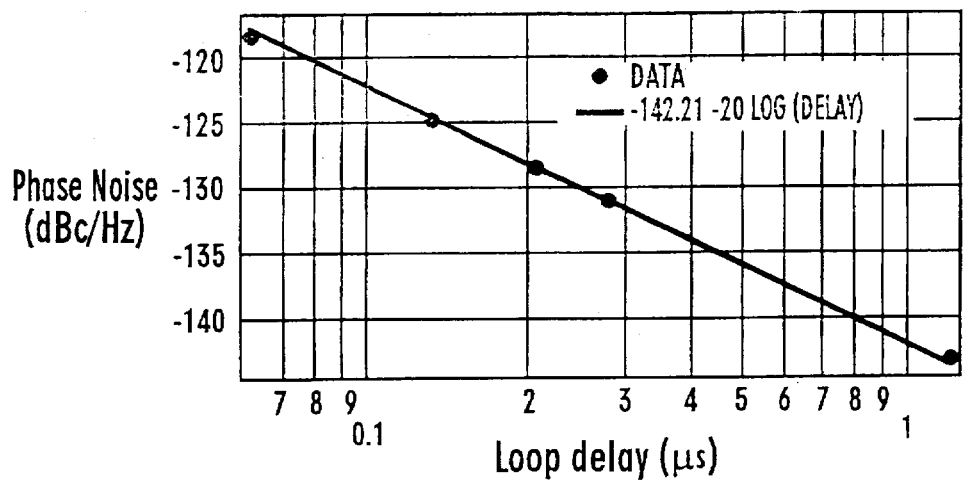
FIG. 4D is a graph of an opto-electronic oscillator's measured phase noise as a function of loop delay time, extrapolated from the curves of FIG. 4A.
Figure 4E:
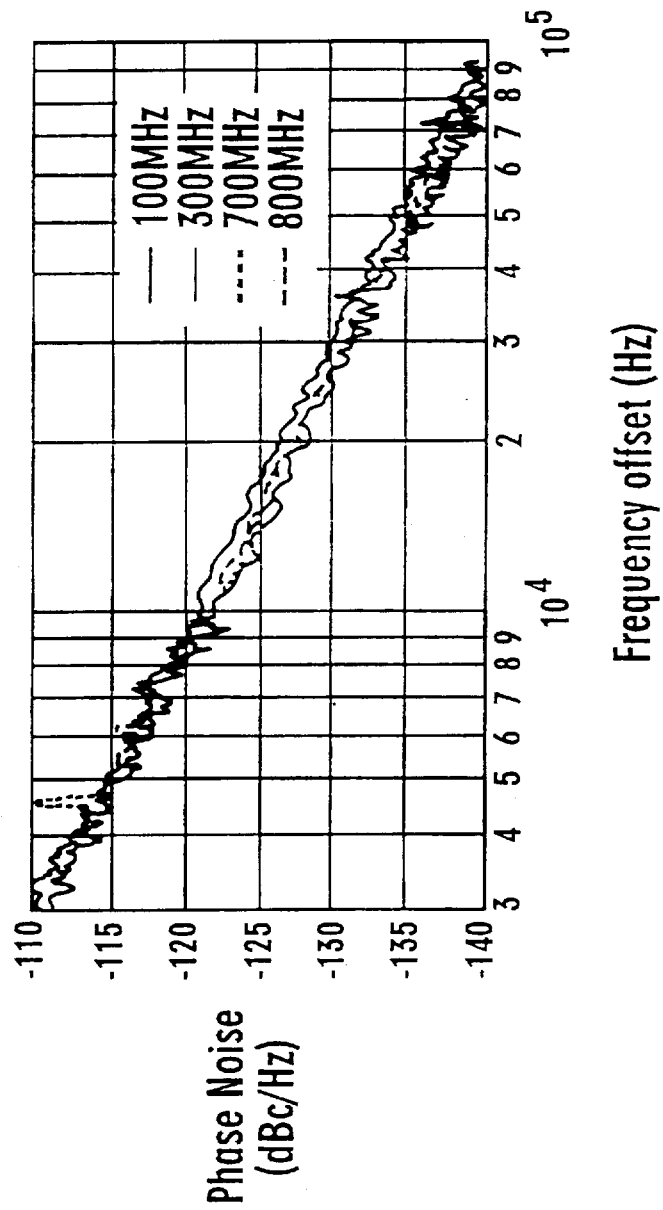
FIG. 4E is a graph of experimental results of the phase noise of an opto-electronic oscillator at frequencies 100 MHz, 300 MHz, 700 MHz, and 800 MHz.

FIG. 4C is the measured phase noise as a function of the frequency offset f' plotted in a log scale. Clearly, the phase noise has a 20 per decade dependency with the frequency offset f', which agrees well with the theoretical prediction of Equation 18b. FIG. 4D is the measured phase noise as a function of loop delay time, extrapolated from the curves of FIG. 4C. Again, the experimental data agrees well with the theoretical prediction. FIG. 4E shows the experimental results of the phase noise of an O/E oscillator 10 at frequencies 100 MHz, 300 MHz, 700 MHz, and 800 MHz. The phase noise curves overlap with one another. The results indicate that the phase noise is essentially independent of the osillation frequency of the photonic oscillator.

Injection locking is a commonly-used technique for synchronizing an oscillator with a reference frequency. The opto-electronic oscillator 10 can be injection locked by either an optical signal 28 or an electrical signal 30 as shown in FIGS. 1A and 1B. Optical injection locking of an oscillator is important to allow remote synchronization. This function is critical for high frequency RF systems that require many oscillators locked to a single master, as in a phased-array radar. Optical injection locking also allows the locking oscillator to be electrically isolated from the locked oscillator, which eliminates the need for impedance matching between the oscillators. Importantly, the present system allows locking to either optical or electrical signals.

Figure 5A:
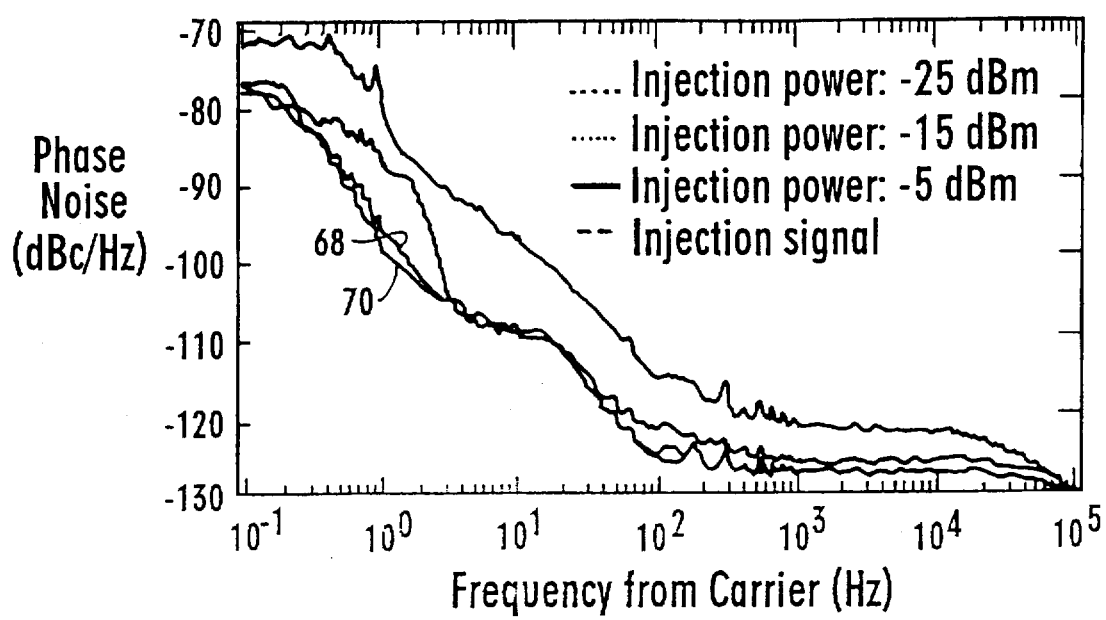
FIG. 5A is a graph of phase noise of an opto-electronic oscillator that was injection-locked to a maser.

FIG. 5A shows the experimental results of injection locking the opto-electronic oscillator 10 with a maser reference at 100 MHz through the electrical injection port 30. The data shown in the curves are smoothed and a peak corresponding to the 60 Hz AC noise is taken out. Similar results are expected for optical injection since the optical injection signal 30 will first be converted to an electrical signal by internal photodetector 16 before affecting the E/O modulator 12.

As shown in FIG. 5A, an injection power of −5 dBm results in the phase noise 68 of the opto-electronic oscillator 10 that is almost identical to that of the injected maser signal 70. Note that the output RF power of the opto-electronic oscillator is 13 dBm, resulting in a gain of 18 dB. As the injection power decreases, the phase noise of the opto-electronic oscillator increases somewhat. However, the output RF power remains the same so that the gain, effectively, is increased. The opto-electronic oscillator 10 has been injection locked experimentally to a maser reference with an injection power as low as −50 dBm.

Figure 5B:
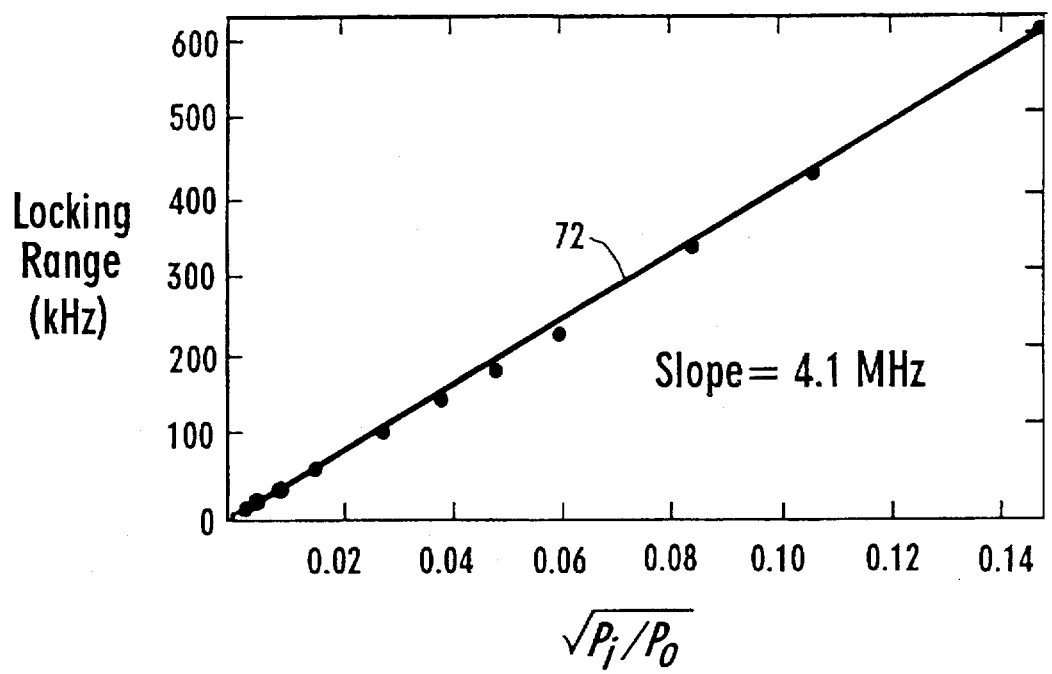
FIG. 5B is a graph of locking range as a function of the square-root of the injection power.

FIG. 5B shows an experimentally produced locking range 72 as a function of injection power. As expected, the locking range is linearly proportional to the square-root of the injection power. This agrees well with the well-known Adler's injection locking theory.

Although injection locking is an effective way of synchronizing and stabilizing oscillators, it requires the oscillator to be supplied with a low noise and high stability source. However, at high frequencies, producing such a source is itself a difficult task.

Figure 6A:
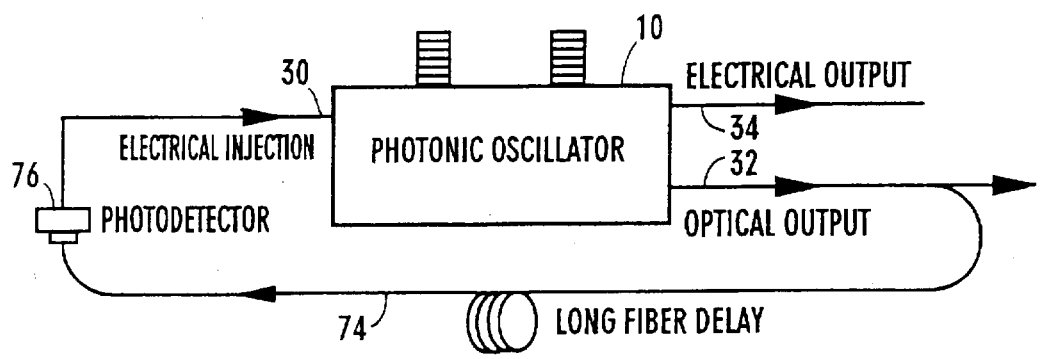
FIG. 6A is a block diagram of the opto-electronic oscillator of FIG. 2 in a self-injection locking configuration.

Another aspect of the present invention uses self-injection locking. This technique stabilizes the frequency and phase of the opto-electronic oscillator 10 to facilitate using the oscillator 10 as the frequency reference. This is illustrated in FIG. 6A.

The self-injection locking sends a small portion of the output optical signal from the O/E oscillator through a fiber delay line 74 that is typically at least one kilometer long and may be many kilometers long. A photodetector 76 converts the output from the fiber delay line 74 to an electric signal and feeds the electrical signal back to the RF driving port 30 of the E/O modulator 12. Note that the open-loop gain of this feedback loop should be kept well below unity to prevent self-oscillation. Basically, self-injection locking injects a delayed replica of the O/E oscillator's output 32 back to the oscillator 10 and forces the oscillator 10 to lock to its "past". This tends to prevent the oscillator 10 from changing its frequency and phase, and thereby reduces or eliminates frequency and phase fluctuations that may be caused by noise sources such as temperature fluctuations, acoustic perturbations and amplifier noise. The frequency stability of the oscillator 10 is proportional to the length fluctuation $\Delta L/L$ of the fiber delay line, which can be known and controlled very precisely.

Figure 6B:
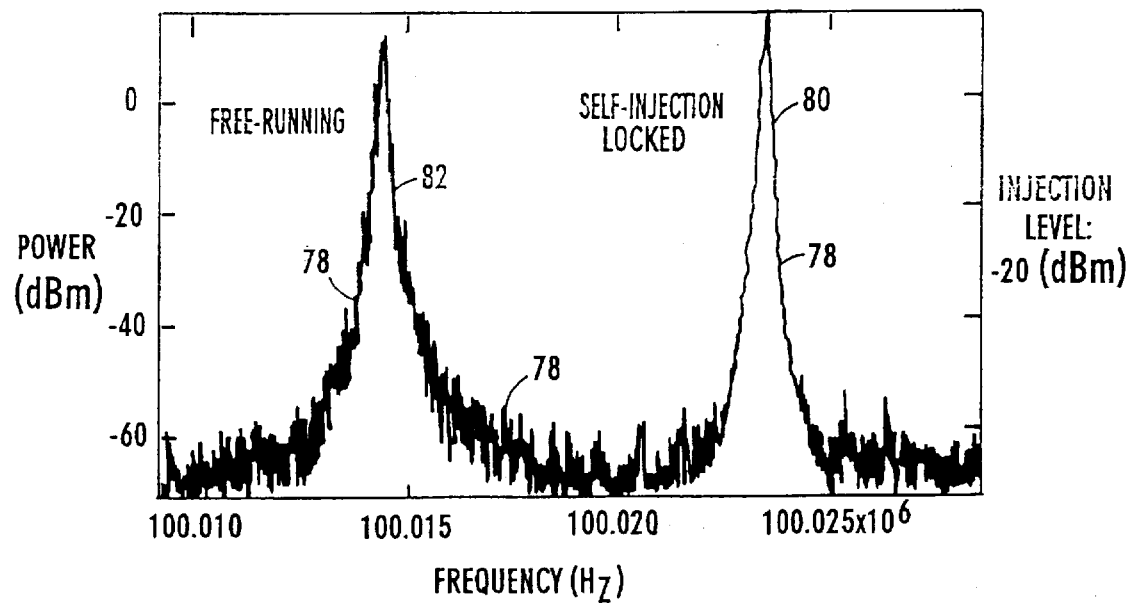
FIG. 6B is a graph of the frequency response of the configuration of FIG. 6A.

FIG. 6B provides experimental results 78 showing the effectiveness of the self-injection technique (peak 80) in reducing the frequency noise of the O/E oscillator 10 relative to a free-running O/E oscillator (peak 82). The length of the delay line 74 used in the experiment is 12 km and the feedback injection RF power is −19.23 dBm. It is evident that self-injection locking greatly reduces the frequency fluctuations of the O/E oscillator.

Even further noise reduction can be obtained by reducing the length fluctuation of the fiber delay line 74 by temperature control of the environment and isolation from acoustic vibrations.

Figure 7A:
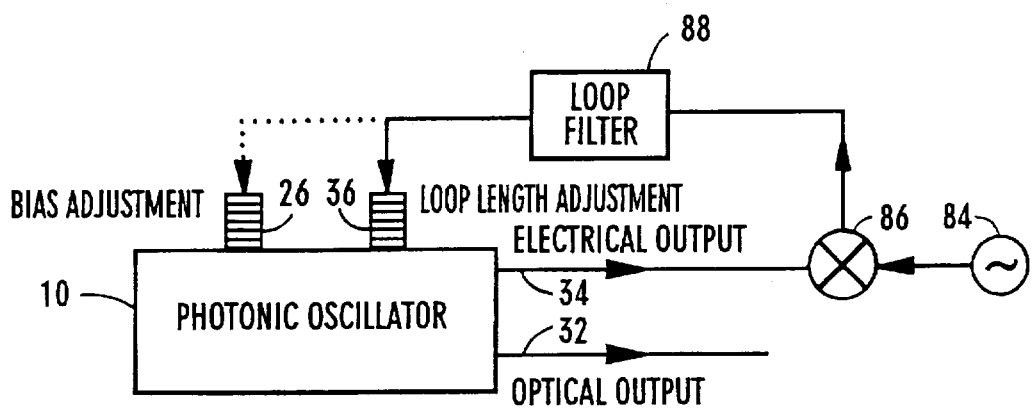
FIGS. 7A and 7B are block diagrams of the opto-electronic oscillator configured as a phase locked loop, with FIG. 7A illustrating phase locking to a reference source and FIG. 7B illustrating self-phase locking.

Because the opto-electronic oscillator is also a voltage controlled oscillator (VCO), it can be synchronized to a reference source 84 via a phase locked loop as shown in FIG. 7A. A summing junction 86 combines the reference 84 and the electrical output 34 of the opto-electronic oscillator 10, and supplies the result to the loop length adjustment terminal 36 or the bias terminal 26 after passing the result through a loop filter 88.

Figure 7B:
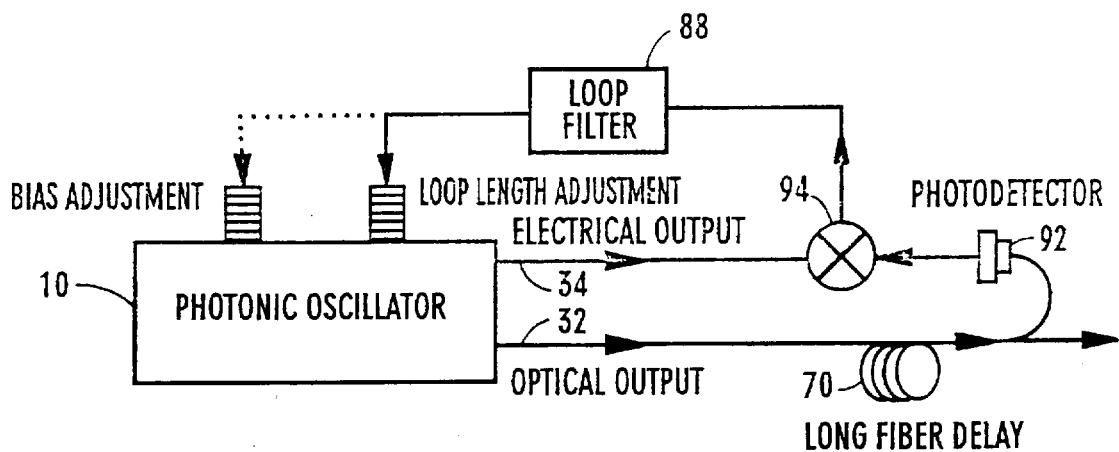

One unique property of the opto-electronic oscillator is its optical output 32. This optical output permits stabilization through a self-phase locked loop, as shown in FIG. 7B. In a similar way to the self-injection locking described above, a self-phase locked loop forces the oscillator to be locked to its past and prevents fluctuation. The optical output 32 of the opto-electronic oscillator is passed through a long fiber delay line 90. A photodetector 92 monitors the output of the fiber delay line and produces an electrical signal corresponding to the output. This electrical signal is supplied to a summing junction 94 that sums the signal with the electrical output 34 of the opto-electronic oscillator and supplies the result to one of ports 26, 36 after passing it through a loop filter 88.

There have been previous suggestions to use a delay line to stabilize an oscillator. However, effective stabilization of an optical oscillator was considered impractical. The reason is exemplified by systems like that proposed by R. Logan et al. ("Stabilization of Oscillator Phase Using a Fiber Optic Delay-Line", *Proceedings of the 45th Annual Symposium on Frequency Control* (IEEE Ultrasonic Ferroelectric and Frequency Control Society), May 29–31, Los opto-electronic Angeles, Calif., 1991). Logan proposed a fiber optic delay line to stabilize a traditional VCO. The fiber optic delay line included a laser transmitter to convert the electrical output of the VCO into an optical signal that was then transmitted through a few kilometers of fiber. The opto-electronic oscillator 10 automatically produces an optical output. The inventors recognized that this makes it ideally suited for use with the fiber delay line technique of self-stabilization. No electrical to optical signal conversion is necessary. Consequently, the device is simple, low loss, and relatively inexpensive.

As mentioned earlier, the opto-electronic oscillator 10 is a photonic VCO with both optical and electrical outputs. It can perform for photonic RF systems all functions that a VCO is capable of performing for RF systems. These functions include generating, tracking, cleaning, amplifying, and distributing RF carriers. In a phase locked loop configuration, the photonic VCO can also be used for clock recovery, carrier recovery, signal modulation and demodulation, and frequency synthesis.

Figure 8:
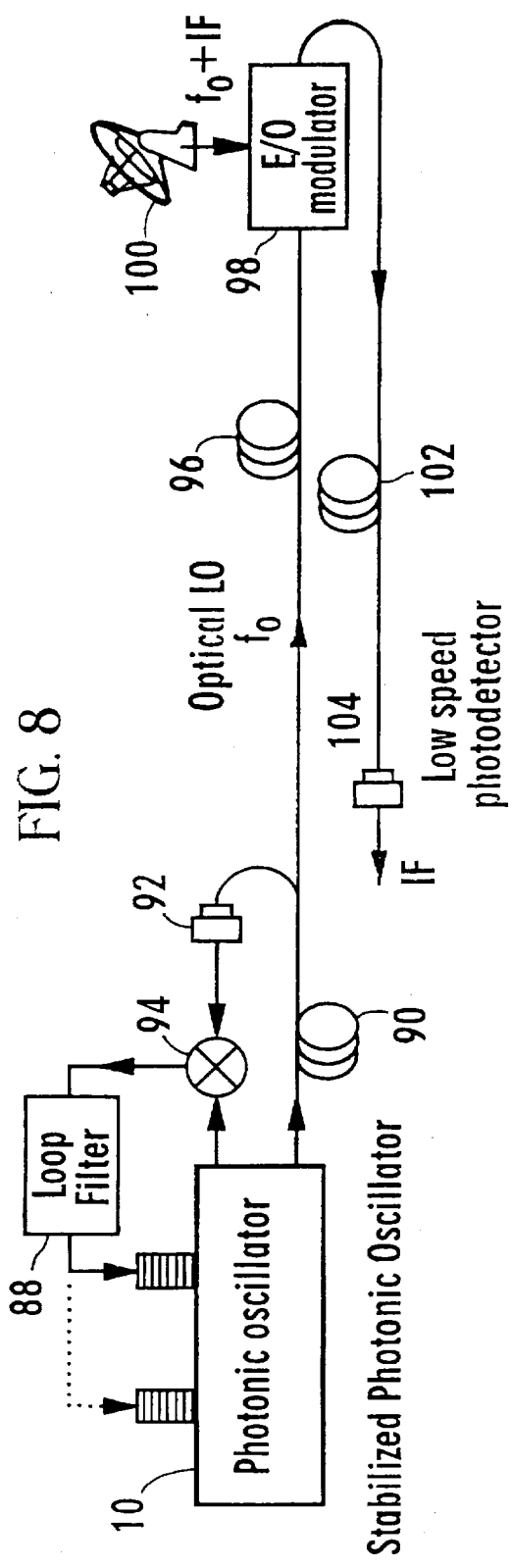
FIG. 8 is a block diagram of the opto-electronic oscillator of FIG. 2 when configured for photonic down conversion.

The opto-electronic oscillator 10 can also be used for photonic signal up/down conversion, as shown in FIG. 8. Such an application requires a stable optical RF local oscillation (LO) signal (i.e., an optical signal modulated at a RF frequency). The self-stabilization technique discussed above with reference to FIG. 7B configures the opto-electronic oscillator to produce the required stable optical RF LO signal ($f_O$). This signal is transmitted through an optical fiber 96 to an E/O modulator 98 that modulates the signal based on a signal ($f_O+I_F$) received from a downlink 100. The modulated signal is transmitted through an optical fiber 102 to a low speed photodetector 104 that produces an electrical signal corresponding to the baseband signal (IF).

Figure 9:
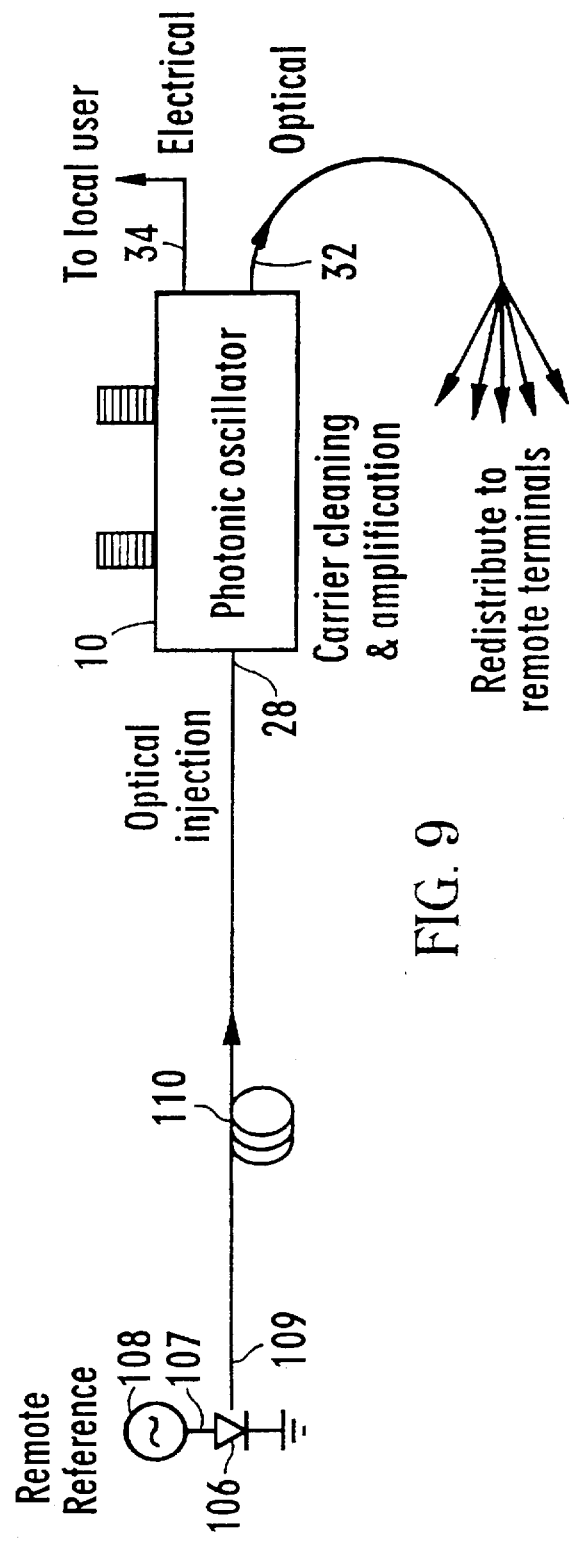
FIG. 9 is a block diagram of the opto-electronic oscillator of FIG. 2 configured for reference regeneration and distribution.

The opto-electronic oscillator can be injection locked by a remote optical signal to carry out high frequency RF carrier regeneration, amplification, and distribution, as shown in FIG. 9. Laser diode 106 converts an electrical reference signal 107 from a remote source 108 to an optical signal 109. Optical signal 109 is transmitted by an optical fiber 110 to the optical input port 28 of opto-electronic oscillator 10. The oscillator is injection-locked to optical signal 109 so that the outputs of opto-electronic oscillator 10 oscillate at the frequency of, and in phase with, optical signal 109. The electrical output 34 of the opto-electronic oscillator 10 is supplied to a local user while the optical output 32 of the oscillator is redistributed to remote terminals. This capability is important in large photonic RF systems.

Figure 10A:
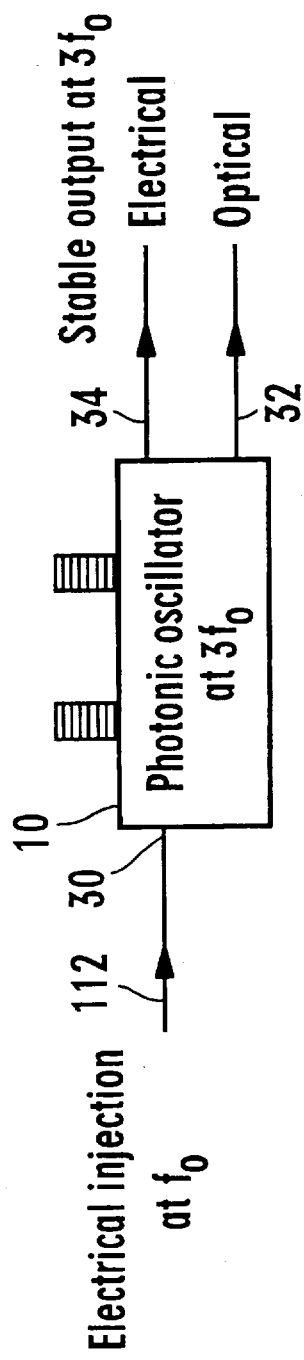
FIGS. 10A and 10B are block diagrams of the opto-electronic oscillator of FIG. 2 configured for frequency multiplication, with FIG. 10A illustrating frequency multiplication using nonlinearity of the opto-electronic oscillator, and FIG. 10B illustrating frequency multiplication using a laser diode's nonlinearity.

The injection locking property of the opto-electronic oscillator can also be used for high gain frequency multiplication. A first approach is shown in FIG. 10A. A signal supplied to the electrical input 30 of the oscillator has a frequency $f_O$ that is a subharmonic of the frequency at which the oscillator is configured to operate (e.g., $3f_O$). The oscillator is injection-locked to the signal supplied to the electrical input 30. Due to nonlinearity of the E/O modulator 12 (FIG. 1A), the oscillator produces output signals at ports 32, 34 having frequencies equal to the operating frequency of the oscillator (i.e., $3f_O$). This is called subharmonic injection locking. Phase-locking of an oscillator operating at 300 MHz to a 100 MHz reference of 4 dBm has been achieved. The output of the oscillator is 15 dBm, resulting in a gain of 11 dB and a frequency multiplication factor of 3.

Figure 10B:
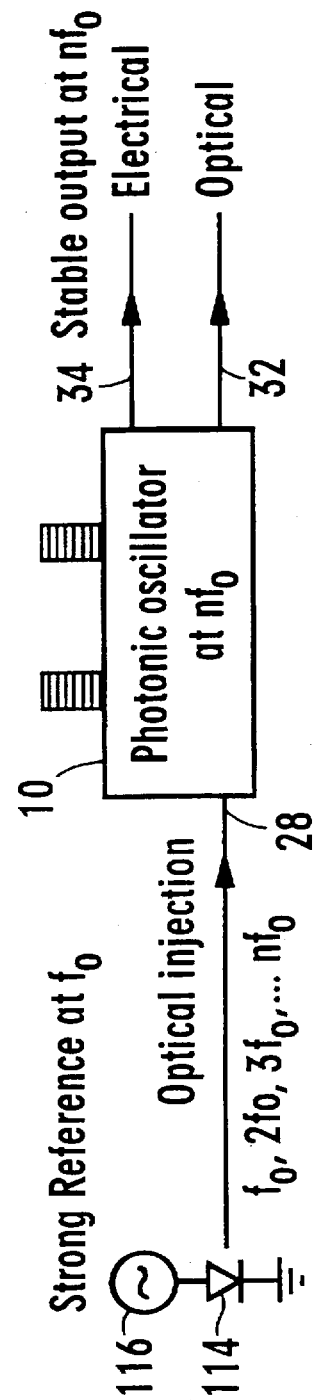

In a second approach, as illustrated in FIG. 10B, the nonlinearity of a laser diode 114 is used to achieve frequency multiplication. If the laser diode 114 is biased properly and is driven hard enough, its output will contain many harmonics of the driving signal at frequency $f_O$ supplied by a driving source 116. The opto-electronic oscillator 10 is tuned to operate at a nominal frequency close to the nth harmonic ($nf_O$) of the signal driving the laser diode 114. The output of the laser diode 114 is supplied to the optical injection port 28 of the oscillator. This locks the electrical and optical outputs of the oscillator to the nth harmonic ($nf_O$). This approach offers remote frequency multiplication capability and may be useful for many photonic RF systems.

Figure 11A:
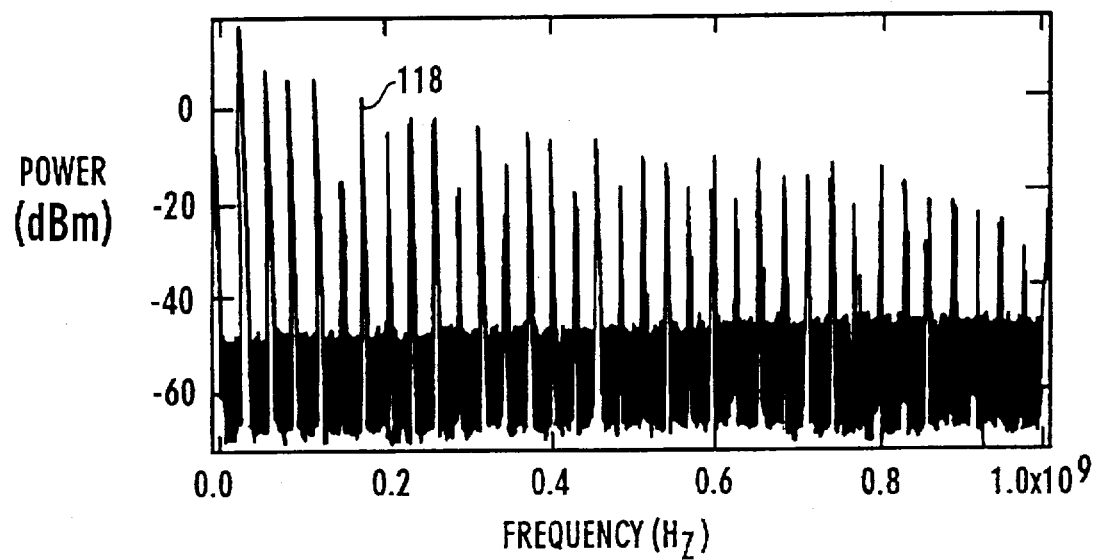
FIGS. 11A and 11B are graphs of comb frequencies (FIG. 11A) and square waves (FIG. 11B) produced by an opto-electronic oscillator.
Figure 11B:
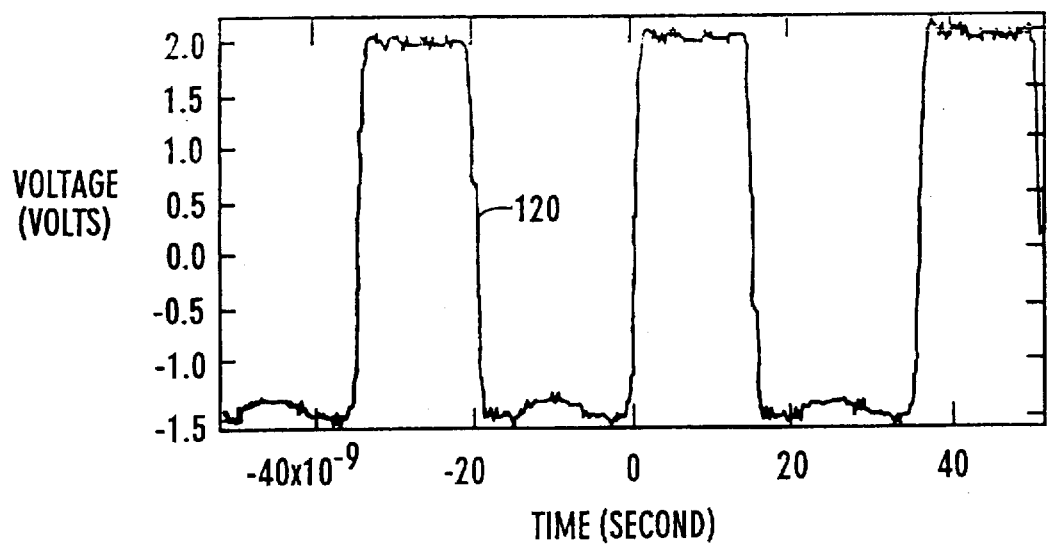

The opto-electronic oscillator can also be used to generate frequency combs and square waves, as shown in FIGS. 11A and 11B. For this application, the opto-electronic oscillator 10 is configured for multimode operation by eliminating the filter 22. A sinusoidal signal with a frequency equal to the mode spacing or a multiple of the mode spacing of the oscillator is injected into the oscillator. Just like laser mode-locking, this injected signal forces all modes to oscillate in phase. Consequently, as shown in FIG. 11A, the oscillator produces a comb of frequencies 118 that are in phase. In the time domain, as shown in FIG. 11B, the output signal corresponds to a square wave 120. When the oscillating modes of the oscillator are not mode-locked, the phase of each mode fluctuates independently, and the output of the oscillator is chaotic in the time domain.

As noted above, further noise reduction and frequency stabilization can be obtained by placing the fiber delay in a temperature controlled environment and isolating it from acoustic vibrations.

Figure 12:
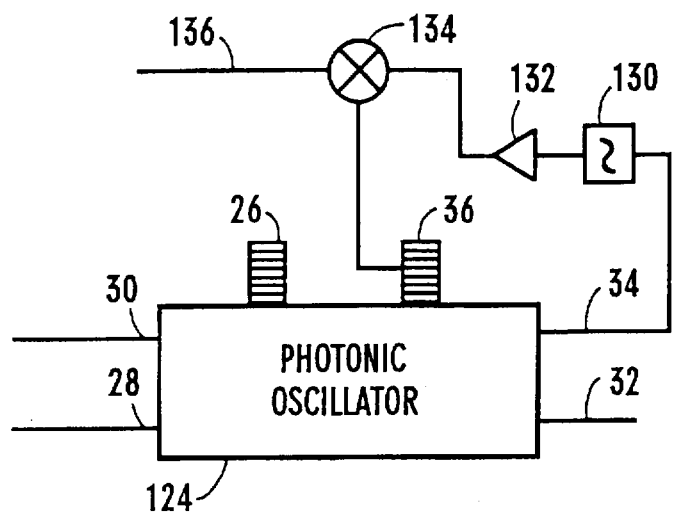
FIG. 12 is a block diagram of the opto-electronic oscillator of FIG. 2 in a loop-length stabilization configuration.
Figure 13A:
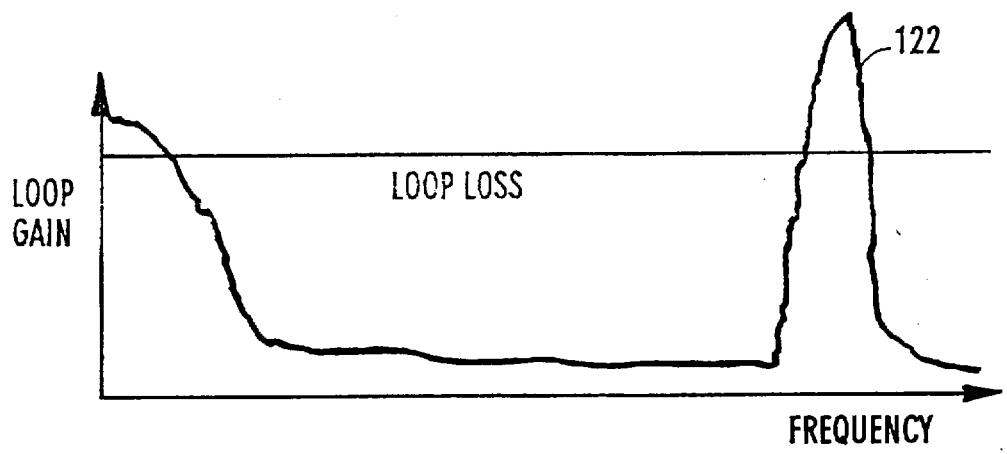
FIGS. 13A and 13B are graphs of frequency responses of an opto-electronic oscillator.
Figure 13B:
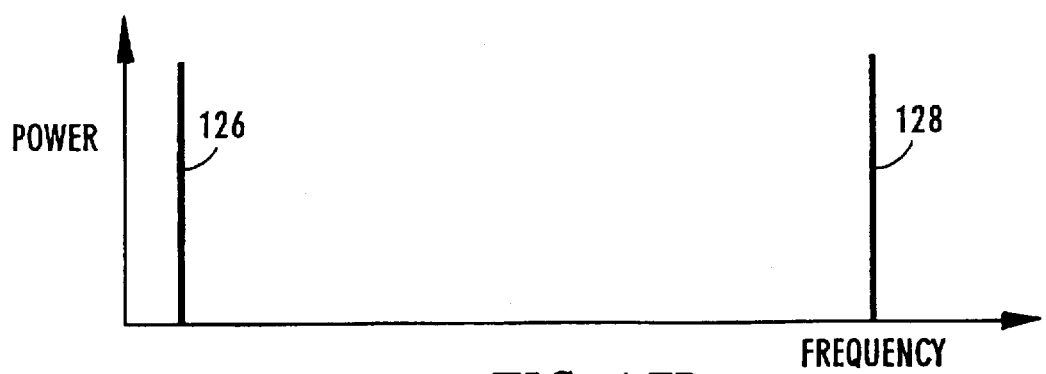

Another approach to frequency stabilization is illustrated in FIG. 12. In general, with reference to FIG. 1A, the frequency response of the open loop gain of an oscillator 10 is determined by the frequency responses of the modulator 12, photodetector 16, amplifier 18 and filter 22. By choosing the proper components, the open loop response 122 shown in FIG. 13A can be obtained. The resulting oscillator 124 will oscillate in two modes, as shown in FIG. 13B, where one of the modes 126 is at a low frequency (e.g., less than 100 MHz) and the other mode 128 is at a high frequency (e.g., 32 GHz). The oscillator is designed to generate the high frequency oscillation subcarrier.

FIG. 12 shows the electrical output 34 being supplied to a low pass filter 130 that removes the high frequency component thereof and provides the low frequency component to an amplifier 132. A mixer 134 combines the output of the amplifier with a reference signal 136 operating at the frequency of the low frequency component. The result of the mixing operation is supplied to the loop length adjustment port 36 of the opto-electronic oscillator 124. Since $\Delta f/f = -\Delta L/L$, the frequency stability of the reference signal is translated to the relative loop length stability. When the loop length is stabilized, the high frequency oscillation will also be stabilized with the stability of the reference signal. Since a stable low frequency reference signal is relatively easy to generate, this method of frequency stabilization may be more attractive and practical than the injection-locking technique in some circumstances.

High speed fiber optic communication systems must have the ability to recover a clock from incoming random data. The injection locking technique described above allows the opto-electronic oscillator 10 to be used for clock and carrier recovery.

Figure 14A:
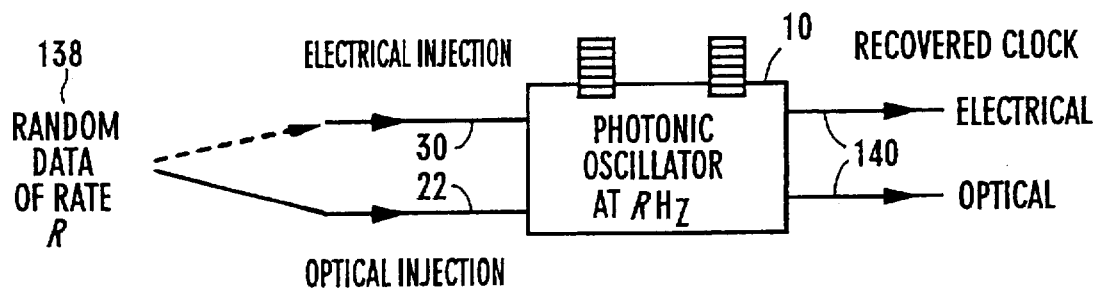
FIGS. 14A and 14B are block diagrams of the opto-electronic oscillator of FIG. 2 configured for clock (FIG. 14A) and carrier (FIG. 14B) recovery.

FIG. 14A shows incoming random data 138 having a transmission rate R being injected into an opto-electronic oscillator 10 through either the optical input port 28 or the electrical input port 30. The free running opto-electronic oscillator 10 is tuned to oscillate in a frequency range that includes the clock frequency (R) of the incoming data. The oscillator 10 quickly phase locks to the clock frequency of the injected data stream while rejecting other frequency components (harmonics and subharmonics) associated with the data. Consequently, the output of the opto-electronic oscillator 10 is a continuous periodic wave 140 synchronized with the incoming data (i.e., the output is the recovered clock).

Clock recovery from both return-to-zero and non-return-to-zero data has been demonstrated with excellent results at 100 Mb/s and at 5 Gb/s. Data rates up to 70 Gb/s can also be recovered using the injection locking technique with an opto-electronic oscillator operating at 70 GHz. By contrast, current electronic clock recovery techniques are unable to recover clocks at even half this data rate. Another important feature of the opto-electronic oscillator technique is that the clock can be recovered directly from data as the data exits a fiber optic transmission line, without any need for optical to electrical conversion. In addition, the recovered clock signal has both optical and electrical forms and is easy to interface with a fiber optic communication system.

Figure 14B:
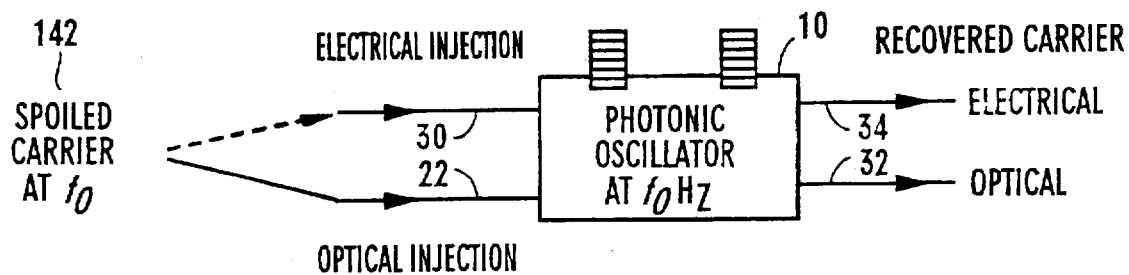

FIG. 14B shows another approach which is similar to clock recovery. The opto-electronic oscillator can also recover a carrier buried in noise. A "spoiled" carrier 142 is injected into an opto-electronic oscillator that has a free running frequency in a range that includes the carrier and an output power level N dB higher than the carrier (where N>>1). The injected carrier locks the opto-electronic oscillator with the carrier and results in an equivalent carrier gain of N dB in the output signal at ports 32 and 34. Because the open loop gain of the opto-electronic oscillator is only n dB (where n<<N), the noise of the input is only amplified by n dB. Hence, the signal to noise ratio of the carrier is increased by (N−n) dB.

Figure 15:
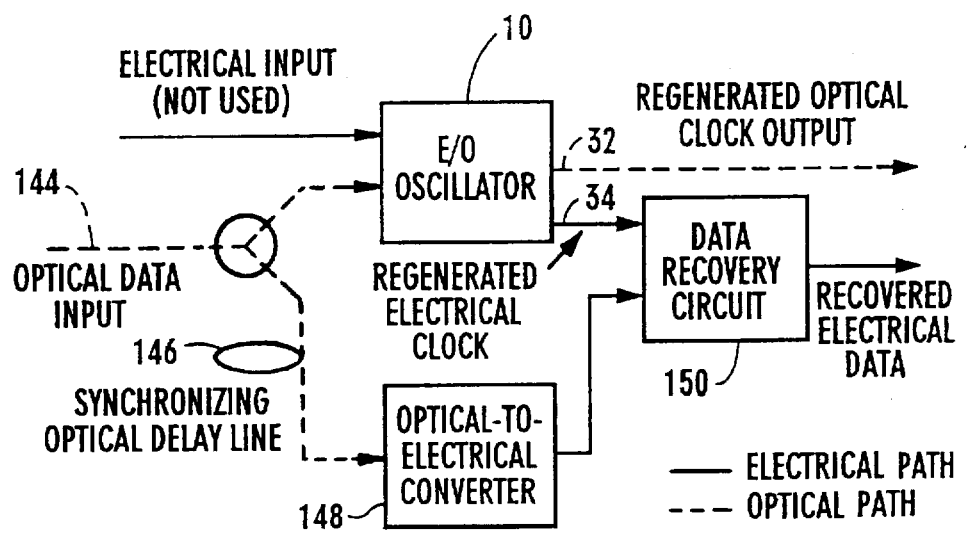
FIG. 15 is a block diagram of a clock recovery, synchronization and signal recovery system.

FIG. 15 illustrates the flow of a clock recovery, synchronization and signal recovery system based on the recovery technique described above. An optical carrier 144 including high data rate information arrives from a remote location, and is split into two parts. One of these parts is injected into an opto-electronic oscillator 10 configured as a clock regenerator of FIG. 14A. The other part is delayed in an optical delay line 146 that delays the received signal long enough for the oscillator to lock. This prevents data bits from being lost from the leading edge of the data stream. After passing through the delay line 146, the signal is applied to an optical-to-electrical converter 148 that produces an electrical signal corresponding to the delayed optical signal. This signal, along with the clock signal from the electrical output 34 of the opto-electronic oscillator, is supplied to a data recovery circuit 150 that recovers the digital data from the delayed signal. The clock signal from the optical output 32 of the oscillator can be transmitted over optical fiber of up to several kilometers in length for use by other devices. This eliminates any need for multiple clock recovery devices.

Other contemplated uses of the opto-electronic oscillator include cellular telephone antenna remoting, satellite earth station antenna remoting, and as both an optical and an electrical high frequency oscillator for signal up and down conversions. A mode-locked opto-electronic oscillator can be used as both an electrical and an optical frequency comb generator, where stable frequency comb generation is critical in dense optical and electrical frequency multiplexing systems.

An important advantage of the opto-electronic oscillator 10 is that it can be integrated on a single integrated circuit chip. All of the key components of the device, such as the laser 40, the amplifier 18, the E/O modulator 12, and the photodetector 16 can be based on GaAs technology and can be fabricated on a common substrate.

Other embodiments are within the following claims.

What is claimed is:

1. An opto-electronic oscillator comprising:
   an electric-optical modulator having an electrical input port that accepts an electrical control signal and an optical output port, wherein the electric-optical modulator is operable to generate at the optical output port an optical signal being modulated at an oscillation frequency related to the electrical control signal,
   a photodetector operable to convert a portion of the optical signal from the optical output port of the electro-optical modulator to an electrical signal and to provide the electrical signal to the electrical input port of the electro-optical modulator as the electrical control signal, the electrical signal from the photodetector oscillating at the same oscillation frequency at which the optical signal at the optical output port is modulated, and
   an active feedback loop connecting the optical output port, the photodetector and the electrical input port, said feedback loop having a positive feedback with an open loop gain which is greater than one.

2. The electro-optical oscillator of claim 1, wherein the opto-electronic modulator further comprises an electrical bias port and the frequency at which the optical output signal oscillates is affected by a voltage applied to the bias port.

3. The electro-optical oscillator of claim 1, further comprising an optical fiber having a length longer than a predetermined length to effect a delay time in the active feedback loop, thereby causing the optical signal at the optical output port to have a spectral linewidth at the oscillation frequency below a desired linewidth having a first relation with the delay time and a phase noise below a desired noise level having a second relation with the delay time, the opto-electronic oscillator operable to receive the portion of the optical output signal and to transport said portion to the photodetector.

4. The electro-optical oscillator of claim 3, further comprising a fiber stretcher coupled to the optical fiber, wherein the fiber stretcher includes an electrical input port and is operable to modify a length of the optical fiber in response to a signal applied to the electrical input port.

5. The electro-optical oscillator of claim 4, wherein the opto-electronic oscillator is configured so that the output signal oscillates at a higher frequency and a lower frequency, the oscillator further comprising a second feedback loop operable to combine a low frequency portion of the output signal with a low frequency reference signal to produce a combined electrical signal, and the combined electrical signal being applied to the electrical input port of the fiber stretcher to affect the length of the optical fiber.

6. The electro-optical oscillator of claim 5, wherein the oscillator produces an electrical-output signal at an electrical output that oscillates at the same frequency as the optical output signal, and wherein the feedback loop includes:
   a low pass filter connected to the electrical output and operable to produce a filtered electrical signal from which a high frequency component of the electrical output signal has been removed,
   an amplifier connected to an output of the low pass filter and operable to produce an amplified filtered electrical signal,
   a combiner having a first input port connected to an output of the amplifier, a second input port for receiving the low frequency reference signal, and an output port for producing the combined electrical signal.

7. The electro-optical oscillator of claim 1, further comprising an RF coupler operable to receive the electrical signal produced by the photodetector and to produce an electrical output signal from the received electrical signal.

8. The electro-optical oscillator of claim 7, further comprising an optical coupler operable to combine an external optical control signal with the portion of the optical output signal to produce a combined optical signal, and wherein the photodetector is operable to convert the combined optical signal to an electrical signal and to supply the electrical signal to the electrical input port of the electro-optical modulator as the electrical control signal.

9. The electro-optical oscillator of claim 8, wherein the RF coupler is further operable to combine an external electrical control signal with the electrical signal produced by the photodetector to produce a combined electrical signal, to supply the combined electrical signal as the electrical output signal, and to supply the combined electrical signal to the electrical input port of the electro-optical modulator as the electrical control signal.

10. The electro-optical oscillator of claim 9, wherein the electro-optical modulator further comprises an electrical bias port and the frequency at which the optical output signal oscillates is affected by a voltage applied to the bias port.

11. The electro-optical oscillator of claim 10, further comprising an optical fiber operable to receive the portion of the optical output signal and to transport it to the photodetector.

12. The electro-optical oscillator of claim 11, further comprising a fiber stretcher coupled to the optical fiber, wherein the fiber stretcher includes an electrical input port and is operable to modify a length of the optical fiber in response to a signal applied to the electrical input port.

13. The electro-optical oscillator of claim 12, further comprising an RF amplifier operable to amplify the electrical signal produced by the photodetector to produce an amplified electrical signal, and to supply the amplified electrical signal to the RF coupler.

14. The electro-optical oscillator of claim 12, further comprising a band pass filter disposed in the active feedback loop between the photodetector and the electrical input port of the electrical-optical modulator, operable to effect a filtered electrical signal from the combined electrical signal produced by the RF coupler and to supply the filtered electrical signal to the electrical input port of the electro-optical modulator as the electrical control signal, the filtered electrical signal having a characteristic in frequency domain that is related to the band pass filter.

15. The electro-optical oscillator of claim 8, further comprising:
    a remote source of an electrical reference signal,
    a laser diode operable to convert the electrical reference signal to an optical reference signal, and
    an optical fiber operable to supply the optical reference signal to the optical coupler as the external optical control signal.

16. The electro-optical oscillator of claim 15, wherein:
    the remote source is operable to produce the electrical reference signal at a first frequency and at a power sufficient to cause the laser diode to produce harmonics of the first frequency in the optical reference signal, and
    the electro-optical oscillator is configured to oscillate in a frequency range that includes a second frequency that is an integer multiple of the first frequency so that the optical reference signal causes the output signal to oscillate at the second frequency.

17. The electro-optical oscillator of claim 8, wherein:
    the external optical control signal comprises a stream of digital data at a clock rate having a first frequency, and
    the electro-optical oscillator is configured to oscillate in a frequency range that includes the first frequency so that the external optical control signal causes the output signal to oscillate at the first frequency and thereby causes the electro-optical oscillator to extract a clock signal from the stream of data.

18. A data recovery system including the electro-optical oscillator of claim 17, and further comprising:
    an optical delay line operable to delay the stream of digital data for a time sufficient to permit the electro-optical oscillator to extract the clock signal from the stream of data,
    an optical-to-electrical converter operable to convert the delayed stream of digital data to an electrical data stream, and
    a data recovery circuit operable to receive the electrical output signal of the electro-optical oscillator and the electrical data stream and to produce digital data therefrom.

19. The electro-optical oscillator of claim 8, wherein:
    the external optical control signal comprises a carrier signal having a first frequency and noise, and
    the electro-optical oscillator is configured to oscillate in a frequency range that includes the first frequency so that the external optical control signal causes the output signal to oscillate at the first frequency and thereby causes the electro-optical oscillator to extract the clock signal from the noise.

20. The electro-optical oscillator of claim 7, further comprising a combining circuit operable to combine the electrical output with an electrical reference signal to produce a combined electrical control signal and to supply the combined electrical control signal to a control port to control the oscillation frequency of the output signal to implement a phase locked loop.

21. The electro-optical oscillator of claim 20, wherein the electro-optical modulator further comprises an electrical bias port and the frequency at which the optical output signal oscillates is affected by a voltage applied to the bias port, and wherein the electrical bias port is the control port to which the combined electrical control signal is supplied.

22. The electro-optical oscillator of claim 20, further comprising:
    an optical fiber operable to receive the portion of the optical output signal and to transport it to the photodetector, and
    a fiber stretcher coupled to the optical fiber, wherein the fiber stretcher includes an electrical input port and is operable to modify a length of the optical fiber in response to a signal applied to the electrical input port, and wherein the electrical input port is the control port to which the combined electrical control signal is supplied.

23. The electro-optical oscillator of claim 20, further comprising an electrical reference source operable to produce the electrical reference signal.

24. The electro-optical oscillator of claim 20, further comprising:
    a fiber delay line for producing a delayed version of the optical output signal of the electro-optical modulator, and
    a second photodetector operable to convert the delayed version of the optical output signal to an electrical signal and to supply the electrical signal to the combining circuit as the electrical reference signal.

25. A data downlink system including the electro-optical oscillator of claim 20, and further comprising:
    a second electro-optical modulator operable to receive the optical output signal of the electro-optical oscillator and to modulate the optical output signal using an electrical control signal from a downlink receiver to produce a modulated optical signal, and
    a low speed photodetector operable to extract the electrical control signal from the modulated optical signal.

26. The electro-optical oscillator of claim 1, further comprising an RF coupler operable to receive the electrical signal produced by the photodetector, to combine an external electrical control signal with the electrical signal produced by the photodetector to produce a combined electrical signal, and to supply the combined electrical signal to the electrical input port of the electro-optical modulator as the electrical control signal.

27. The electro-optical oscillator of claim 26, further comprising:
a fiber delay line for producing a delayed version of the optical output signal of the electro-optical modulator, and
a second photodetector operable to convert the delayed version of the optical output signal to a delayed electrical signal and to supply the delayed electrical signal to the RF coupler as the external electrical control signal.

28. The electro-optical oscillator of claim 27, wherein a length of the fiber delay line is greater than one kilometer.

29. The electro-optical oscillator of claim 1, further comprising an optical coupler operable to combine an external optical control signal with the portion of the optical output signal to produce a combined optical signal, and wherein the photodetector is operable to convert the combined optical signal to an electrical signal and to supply the electrical signal to the electrical input port of the electro-optical modulator as the electrical control signal.

30. The electro-optical oscillator of claim 1, further comprising a laser source for supplying a laser signal to the electro-optical modulator, wherein the laser source, the electro-optical modulator and the photodetector are all implemented on a single integrated circuit substrate.

31. The opto-electronic oscillator of claim 1, wherein the active feedback loop comprises an optical delay line.

32. The opto-electronic oscillator of claim 1, wherein the active feedback loop comprises an RF delay line.

33. A method of generating an oscillatory optical signal comprising the steps of:
modulating an optical signal with an electrical control signal in an electro-optical modulator to produce a modulated optical output signal having a frequency related to the electrical control signal,
forming an active feedback loop having a positive feedback with an open loop gain greater than one to effect the oscillation,
converting a portion of the modulated optical output signal to an electrical signal that propagates in the feedback loop, and
supplying the electrical signal produced in the converting step to the electro-optical modulator through the feedback loop as the electrical control signal.

34. A photonic device, comprising:
an electro-optical modulator having an input port for signals of a predetermined form, and having an output port for signals of a second predetermined form, one of said first and second predetermined forms being an electrical oscillating signal at an oscillating frequency and the other of said first and second predetermined forms being an optical oscillating signal that is modulated at said oscillating frequency; and
a converter operable to convert said first predetermined form signal to said second predetermined form signal; and
an element operable to conduct said first predetermined form signal to said converter and to conduct said second predetermined form signal to said input port, to form a feedback loop which uses both said electrical and optical signal and synchronizes to both, said feedback loop having a positive feedback with an open loop gain greater than one.

35. A system as in claim 34, further comprising optical and electrical injection ports, respectively allowing injection of optical and electrical injection signals, and to which said output signal is injection locked.

36. A system as in claim 34 further comprising an element operable to delay an output signal of said modulator by a time which is effective to lock said output to a past state.

37. A system as in claim 36 wherein said first predetermined output is optical, and wherein said element is a fiber delay line of at least 1 kilometer in length.

38. An opto-electronic oscillator as in claim 14, wherein the RF coupler includes an electrical output port for exporting an electrical signal, and an electrical input port for injecting an external electrical signal into the active feedback loop and enabling the RF coupler to combine the electrical signal from the photodetector and the external electrical signal, the external electrical signal oscillating at an injection frequency which is a subharmonic of the oscillating frequency of the active feedback loop, thereby producing a signal gain and frequency multiplication in an electrical output signal at the electrical output port with respect to the injected external electrical signal.

39. An opto-electronic oscillator as in claim 12, wherein the RF coupler includes an electrical output port for exporting an electrical signal, and an electrical input port for injecting an external electrical signal into the active feedback loop and enabling the RF coupler to combine the electrical signal from the photodetector and the external electrical signal, the opto-electronic oscillator further comprising:
an electrical signal generator connected to the electrical input port in the RF coupler, operating to produce a periodic signal having a signal period in frequency domain that is substantially equal to the mode spacing of the oscillation in the active feedback loop or a multiplication thereof, the periodic signal being injected at the input port as the external electrical signal; and
mode locking means for forcing different modes oscillate with a certain phase relation with respect to one another in a way that is determined by the injected periodic signal, producing a periodic pulsed signal in at least one of optical form and electrical form.

40. A method as in claim 33, further comprising:
filtering the electrical signal in the active feedback loop at a center frequency with a predetermined bandwidth with a band pass filter; and
effecting a single-mode oscillation by the filtering.

41. A method as in claim 33, further comprising:
producing a phase delay in the electrical control signal with the active feedback loop; and
increasing the phase delay larger than a predetermined delay value to effect a delay time in the active feedback loop to cause the optical signal to have a spectral linewidth at the oscillation frequency below a desired linewidth having a first relation with the delay time and a phase noise below a desired noise level having a second relation with the delay time.

* * * * *